United States Patent
Higuchi et al.

(10) Patent No.: US 10,873,876 B2
(45) Date of Patent: Dec. 22, 2020

(54) WIRELESS COMMUNICATION ASSURANCE FOR CONNECTED VEHICLES IN HIGH NETWORK LOAD SCENARIOS

(71) Applicant: TOYOTA JIDOSHA KABUSHIKI KAISHA, Toyota (JP)

(72) Inventors: Takamasa Higuchi, Mountain View, CA (US); Onur Altintas, Mountain View, CA (US); Michele Zorzi, Mountain View, CA (US); Andrea Zanella, Mountain View, CA (US); Marco Giordani, Mountain View, CA (US)

( * ) Notice: Subject to any disclaimer, the term of this patent is extended or adjusted under 35 U.S.C. 154(b) by 57 days.

(21) Appl. No.: 16/181,479

(22) Filed: Nov. 6, 2018

(65) Prior Publication Data
US 2020/0145875 A1 May 7, 2020

(51) Int. Cl.
| | |
|---|---|
| H04W 28/04 | (2009.01) |
| H04W 4/40 | (2018.01) |
| H04L 12/859 | (2013.01) |
| H04L 12/801 | (2013.01) |
| H04W 28/02 | (2009.01) |

(52) U.S. Cl.
CPC ............ *H04W 28/04* (2013.01); *H04L 47/14* (2013.01); *H04L 47/2475* (2013.01); *H04W 4/40* (2018.02); *H04W 28/0205* (2013.01)

(58) Field of Classification Search
None
See application file for complete search history.

(56) References Cited

U.S. PATENT DOCUMENTS

| | | | |
|---|---|---|---|
| 2013/0083679 A1* | 4/2013 | Krishnaswamy | ........................... H04W 56/0035 370/252 |
| 2016/0080279 A1* | 3/2016 | Tan | ........................ H04L 47/32 370/328 |
| 2017/0201461 A1* | 7/2017 | Cheng | .................... H04L 47/286 |
| 2017/0255667 A1* | 9/2017 | Ochiai | ................ G06F 16/2358 |

* cited by examiner

*Primary Examiner* — Charles C Jiang
*Assistant Examiner* — Saad Khawar
(74) *Attorney, Agent, or Firm* — Burbage Law, P.C.; Jon-Michael Burbage; Elizabeth Ruzich

(57) ABSTRACT

The disclosure includes embodiments for reliably transmitting valuable information to an endpoint via a Vehicle-to-Everything (V2X) network. In some embodiments, a method includes receiving a stream of data bits describing one or more pieces of information intended to be delivered to the endpoint via the V2X network. The method includes determining one or more values of the one or more pieces of information respectively. The one or more values are evaluated with respect to the endpoint and indicate whether the one or more pieces of information are valuable information with respect to the endpoint. The method includes implementing a communication-assurance action based on the one or more values. The method includes modifying an operation of a communication unit of a connected vehicle based on the communication-assurance action so that the valuable information is reliably delivered to the endpoint even in a scenario where the V2X network is congested.

20 Claims, 16 Drawing Sheets

| Attribute | Application: Safety | | |
|---|---|---|---|
| | Time Dependency | Space Dependency | Information Quality |
| Time-Dependency | 1 | $\alpha$ | $\beta$ |
| Space-Dependency | $1/\alpha$ | 1 | $\gamma$ |
| Information Quality | $1/\beta$ | $1/\gamma$ | 1 |

| 1 | 3 | 5 | 7 | 9 |
|---|---|---|---|---|
| *equal* | *moderate* | *strong* | *very strong* | *extreme* |

Importance Comparison Matrix

900 →

| | Time dependency | Space dependency | Information quality |
|---|---|---|---|
| Time dependency | 1 | 1 | 3 |
| Space dependency | 1 | 1 | 3 |
| Information quality | 1/3 | 1/3 | 1 |

Figure 9A

Weight Calculation Matrix

910 →

| | Time dependency | | Space dependency | | Information quality | | Sum | | Attribute weight |
|---|---|---|---|---|---|---|---|---|---|
| Time dependency | 1 | + | 1 | + | 3 | = | 5 | →normalization | 0.43 |
| Space dependency | 1 | + | 1 | + | 3 | = | 5 | →normalization | 0.43 |
| Information quality | 1/3 | + | 1/3 | + | 1 | = | 5/3 | →normalization | 0.14 |

Figure 9B (A) Information Comparison Matrix for Time Dependency Attribute  ↙ 920

| | Information A | Information B |
|---|---|---|
| Information A | 1 | 2 |
| Information B | 1/2 | 1 |

(B) Information Comparison Matrix for Space Dependency Attribute  ↙ 922

| | Information A | Information B |
|---|---|---|
| Information A | 1 | 3 |
| Information B | 1/3 | 1 |

(C) Information Comparison Matrix for Information Quality Attribute  ↙ 924

| | Information A | Information B |
|---|---|---|
| Information A | 1 | 5 |
| Information B | 1/5 | 1 |

Figure 9C (A) Value Score Calculation Matrix for Time Dependency Attribute 930

| | Information A | | Information B | | Sum | | Value score based on time-dependency |
|---|---|---|---|---|---|---|---|
| Information A | 1 | + | 2 | = | 3 | → | 0.67 |
| Information B | 1/2 | + | 1 | = | 3/2 | → normalization | 0.33 |

(B) Value Score Calculation Matrix for Space Dependency Attribute 932

| | Information A | | Information B | | Sum | | Value score based on space-dependency |
|---|---|---|---|---|---|---|---|
| Information A | 1 | + | 3 | = | 4 | → | 0.75 |
| Information B | 1/3 | + | 1 | = | 4/3 | → normalization | 0.25 |

(C) Value Score Calculation Matrix for Information Quality Attribute 934

| | Information A | | Information B | | Sum | | Value score based on information quality |
|---|---|---|---|---|---|---|---|
| Information A | 1 | + | 5 | = | 6 | → | 0.83 |
| Information B | 1/5 | + | 1 | = | 6/5 | → normalization | 0.17 |

Figure 9D

WIRELESS COMMUNICATION ASSURANCE FOR CONNECTED VEHICLES IN HIGH NETWORK LOAD SCENARIOS

BACKGROUND

The specification relates to transmitting valuable information to an endpoint reliably via a Vehicle-to-Everything (V2X) network even in a scenario where the V2X network is congested.

Connected vehicles generate more and more data traffic for V2X networks. For example, more and more wireless data is exchanged not only between vehicles and infrastructure devices (e.g., video streaming for in-vehicle infotainment), but also between vehicles (e.g., exchanging sensor measurements among nearby vehicles to detect objects in blind spots, etc.). The growing amount of network traffic can easily overload V2X communication channels. Existing solutions for V2X communication such as a conventional V2X radio installed in a connected vehicle sometimes allow important wireless messages (e.g., those including safety-related information) to lose packets during transmission (or even fail to send entirely) when V2X communication channels are congested. Accordingly, the existing solutions are not adequate because they allow important information to fail in delivery to endpoints that need this information.

SUMMARY

Described are embodiments of a communication assurance system that guarantees that valuable information (e.g., important information) included in each V2X wireless message is reliably delivered, even in scenarios where the V2X communication channels are congested (or even extremely congested). Examples of a V2X wireless message described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message); a 5G-LTE message; and a millimeter wave message, etc.

In some embodiments, the communication assurance system includes software installed in an onboard unit of a connected vehicle. The communication assurance system includes code and routines that are operable, when executed by a processor of the onboard unit, to cause the processor to execute one or more of the following operations:

(1) receiving a stream of data bits intended to be transmitted to an endpoint (e.g., another vehicle, a roadside unit (RSU), etc.), where the stream of data bits includes one or more sets of data bits describing one or more pieces of information, and each set of data bits includes one or more data bits;

(2) determining a roadway context of the endpoint (e.g., roadway conditions, operational information for the endpoint such as a speed, a location, etc.);

(3) for each set of data bits to be transmitted, determining a value of a piece of information described by the set of data bits to the endpoint based on the roadway context (e.g., for each bit of data to be transmitted, determining a value of the information described by the bit to the endpoint based on the roadway context; also noting that the relevant value here is the value of the data to the endpoint that would receive the data, and not the value of the data to the connected vehicle that transmits the data);

(4) determining a current network congestion condition of a V2X network that is used for transmitting the one or more sets of data bits to the endpoint;

(5) determining that the current network congestion condition of the V2X network exceeds a congestion threshold that triggers a remedial action;

(6) implementing one or more remedial actions including one or more of the following: slowing down a transmission rate of the V2X wireless message that transmits the stream of data bits to the endpoint; and determining one or more sets of data bits (e.g., one or more bits of data) to discard (i.e., to be not included in the V2X wireless message) based on (i) their values relative to other data bits in the stream and (ii) an available bandwidth of the V2X network, where the available bandwidth of the V2X network is determined based on the current network congestion condition of the V2X network; and (7) transmitting the V2X wireless message to the endpoint. If one or more sets of data bits are discarded, then the V2X wireless message only includes the other data bits that are not discarded.

The communication assurance system described herein is beneficial in various aspects. For example, the communication assurance system guarantees that valuable information (e.g., important information) included in each V2X wireless message is reliably delivered to an intended recipient, even in scenarios where the V2X communication channels are extremely congested. In comparison, no existing solutions attempt to guarantee that important information included in each V2X wireless message is reliably delivered to an intended recipient, especially in scenarios where the V2X communication channels are congested.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for a connected vehicle, including: receiving a stream of data bits, where the stream of data bits describes one or more pieces of information intended to be delivered to an endpoint via a V2X network; determining one or more values of the one or more pieces of information respectively, where the one or more values are evaluated with respect to the endpoint and the one or more values indicate whether the one or more pieces of information are valuable information with respect to the endpoint; implementing a communication-assurance action on the stream of data bits based on the one or more values and a network condition of the V2X network; and modifying an operation of a communication unit of the connected vehicle based on the communication-assurance action so that the valuable information included in the one or more pieces of information is reliably delivered to the endpoint even in a scenario where the V2X network is congested. Other embodiments of this aspect include corresponding computer systems, apparatus, and computer programs recorded on one or more computer storage devices, each configured to perform the actions of the methods.

Implementations may include one or more of the following features. The method further including: determining context data that describes a roadway context of the endpoint, where the one or more values of the one or more pieces of information are determined based at least in part on the roadway context of the endpoint. The method further including: annotating each piece of information from the one or more pieces of information with factor data describing one or more value-evaluation factors for the corresponding piece of information, where a value of the corresponding piece of information is determined further based on the one or more value-evaluation factors. The method where the one or more value-evaluation factors include one or more of: a type of an application that generates a set of data bits describing the corresponding piece of information; a type of data content described by the set of data bits; a timestamp describing when the set of data bits is generated; an importance level of the corresponding piece of information; an accuracy of the corresponding piece of information; a resolution of the corresponding piece of information; and a source of the corresponding piece of information. The method where the value of the corresponding piece of information is determined at least by: evaluating, for a series of value attributes, a series of per-attribute value scores for the corresponding piece of information based on the one or more value-evaluation factors of the corresponding piece of information and the roadway context of the endpoint; and integrating the series of per-attribute value scores to calculate an aggregate value score as the value of the corresponding piece of information. The method where the series of value attributes includes one or more of: a time dependency attribute; a space dependency attribute; an information quality attribute; a conditionality attribute; a generalizability attribute; an urgency attribute; and an information path attribute. The method where the aggregate value score is an average of the series of per-attribute value scores. The method where integrating the series of per-attribute value scores to calculate the aggregate value score includes: executing an analytic hierarchy process to calculate the aggregate value score for the corresponding piece of information based on the series of per-attribute value scores. The method where executing the analytic hierarchy process to calculate the aggregate value score includes: determining a corresponding application-dependent weight for each value attribute from the series of value attributes; and calculating a weighted average of the series of per-attribute value scores as the aggregate value score for the corresponding piece of information based on the corresponding application-dependent weight of each value attribute. The method where implementing the communication-assurance action on the stream of data bits includes: storing one or more sets of data bits included in the stream of data bits in a queue, where the one or more sets of data bits describe the one or more pieces of information respectively; sorting the one or more sets of data bits in the queue based on the one or more values of the one or more pieces of information; and forwarding the one or more sets of data bits to the communication unit of the connected vehicle sequentially based on an order of the one or more sets of data bits in the queue, so that the communication unit of the connected vehicle is configured to transmit the valuable information to the endpoint before other information included in the one or more pieces of information. The method further including determining network data that describes the network condition of the V2X network. The method where implementing the communication-assurance action on the stream of data bits includes: responsive to the network condition of the V2X network exceeding a predetermined congestion threshold, triggering one or more remedial actions to be performed on the stream of data bits. The method where the one or more remedial actions include one or more of: reducing a transmission rate of the stream of data bits so that a transmission speed of the communication unit of the connected vehicle is reduced; discarding, from the stream of data bits, one or more sets of data bits based on the one or more values so that the communication unit of the connected vehicle transmits one or more remaining sets of data bits that describe the valuable information to the endpoint via the V2X network; implementing a hybrid networking configuration so that one or more network interfaces corresponding to one or more types of V2X networks are selected to transmit the valuable information to the endpoint in parallel; and transmitting the valuable information to the endpoint multiple times. The method where the one or more remaining sets of data bits that describe the valuable information each correspond to a value greater than a predetermined value threshold, and the one or more sets of data bits to be discarded that describe other information included in the one or more pieces of information each correspond to a value less than the predetermined value threshold. The method where the one or more remaining sets of data bits that describe the valuable information each correspond to a value greater than that of each of the one or more sets of data bits to be discarded that describe other information included in the one or more pieces of information. Implementations of the described techniques may include hardware, a method or process, or computer software on a computer-accessible medium.

One general aspect includes a system including an onboard vehicle computer system of a connected vehicle, including a communication unit, a processor and a non-transitory memory storing computer code which, when executed by the processor, causes the processor to: receive a stream of data bits, where the stream of data bits describes one or more pieces of information intended to be delivered to an endpoint via a V2X network; determine one or more values of the one or more pieces of information respectively, where the one or more values are evaluated with respect to the endpoint and the one or more values indicate whether the one or more pieces of information are valuable information with respect to the endpoint; implement a communication-assurance action on the stream of data bits based on the one or more values and a network condition of the V2X network; and modify an operation of the communication unit of the connected vehicle based on the communication-assurance action so that the valuable information included in the one or more pieces of information is reliably delivered to the endpoint even in a scenario where the V2X network is congested. Other embodiments of this aspect include corresponding computer systems, apparatus, and computer programs recorded on one or more computer storage devices, each configured to perform the actions of the methods.

Implementations may include one or more of the following features. The system where the computer code, when executed by the processor, causes the processor further to: annotate each piece of information from the one or more pieces of information with factor data describing one or more value-evaluation factors for the corresponding piece of information; and determine context data that describes a roadway context of the endpoint. The system where a value of each piece of information is determined based on the one or more value-evaluation factors of the corresponding piece of information and the roadway context of the endpoint. The system where the value of each piece of information is determined at least by: evaluating, for a series of value attributes, a series of per-attribute value scores for the corresponding piece of information based on the one or more value-evaluation factors of the corresponding piece of information and the roadway context of the endpoint; and integrating the series of per-attribute value scores to calculate an aggregate value score as the value of the corresponding piece of information. The system where the computer code, when executed by the processor, causes the processor further to determine network data that describes the network condition of the V2X network. The system where the computer code, when executed by the processor, causes the processor to implement the communication-assurance action on the stream of data bits at least by: responsive to the network condition of the V2X network exceeding a predetermined congestion threshold, triggering one or more remedial actions to be performed on the stream of data bits. Implementations of the described techniques may include hardware, a method or process, or computer software on a computer-accessible medium.

One general aspect includes a computer program product including a non-transitory memory storing computer-executable code that, when executed by a processor, causes the processor to: receive a stream of data bits, where the stream of data bits describes one or more pieces of information intended to be delivered to an endpoint via a Vehicle-to-Everything (V2X) network; determine one or more values of the one or more pieces of information respectively, where the one or more values are evaluated with respect to the endpoint and the one or more values indicate whether the one or more pieces of information are valuable information with respect to the endpoint; implement a communication-assurance action on the stream of data bits based on the one or more values and a network condition of the V2X network; and modify an operation of the communication unit of the connected vehicle based on the communication-assurance action so that the valuable information included in the one or more pieces of information is reliably delivered to the endpoint even in a scenario where the V2X network is congested. Other embodiments of this aspect include corresponding computer systems, apparatus, and computer programs recorded on one or more computer storage devices, each configured to perform the actions of the methods.

Implementations may include one or more of the following features. The computer program product where the computer code, when executed by the processor, causes the processor further to determine network data that describes the network condition of the V2X network. The computer program product where the computer code, when executed by the processor, causes the processor to implement the communication-assurance action on the stream of data bits at least by: responsive to the network condition of the V2X network exceeding a predetermined congestion threshold, triggering one or more remedial actions to be performed on the stream of data bits. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 8A is a graphical representation illustrating an importance comparison matrix filled with application-dependent importance values for various value attributes according to some embodiments.

FIG. 8B is a graphical representation illustrating a table that lists relative importance based on a Saaty scale according to some embodiments.

FIGS. 9A-9B are graphical representations illustrating an example importance comparison matrix and an example weight calculation matrix respectively for calculating application-dependent weights for various value attributes according to some embodiments.

FIGS. 9C-9D are graphical representations illustrating example information comparison matrices and example value score calculation matrices for various value attributes used for calculating per-attribute value scores for two pieces of information according to some embodiments.

DETAILED DESCRIPTION

It is desirable that valuable information (e.g., important information such as safety-related messages) is reliably delivered to destination vehicle(s) even when V2X communication channels in a V2X network are congested. Embodiments of a communication assurance system are described herein which ensures that valuable information included in each V2X wireless message is reliably delivered to an intended recipient, even in scenarios where the V2X communication channels are congested.

Examples of V2X communication described herein include, but are not limited to, one or more of the following: Dedicated Short Range Communication (DSRC) (including Basic Safety Messages (BSMs) and Pedestrian Safety Messages (PSMs), among other types of DSRC communication); Long-Term Evolution (LTE); millimeter wave (mmWave) communication; 3G; 4G; 5G; LTE-V2X; LTE-Vehicle-to-Vehicle (LTE-V2V); LTE-Device-to-Device (LTE-D2D); Voice over LTE (VoLTE); etc.

Example Overview

Figure 1:
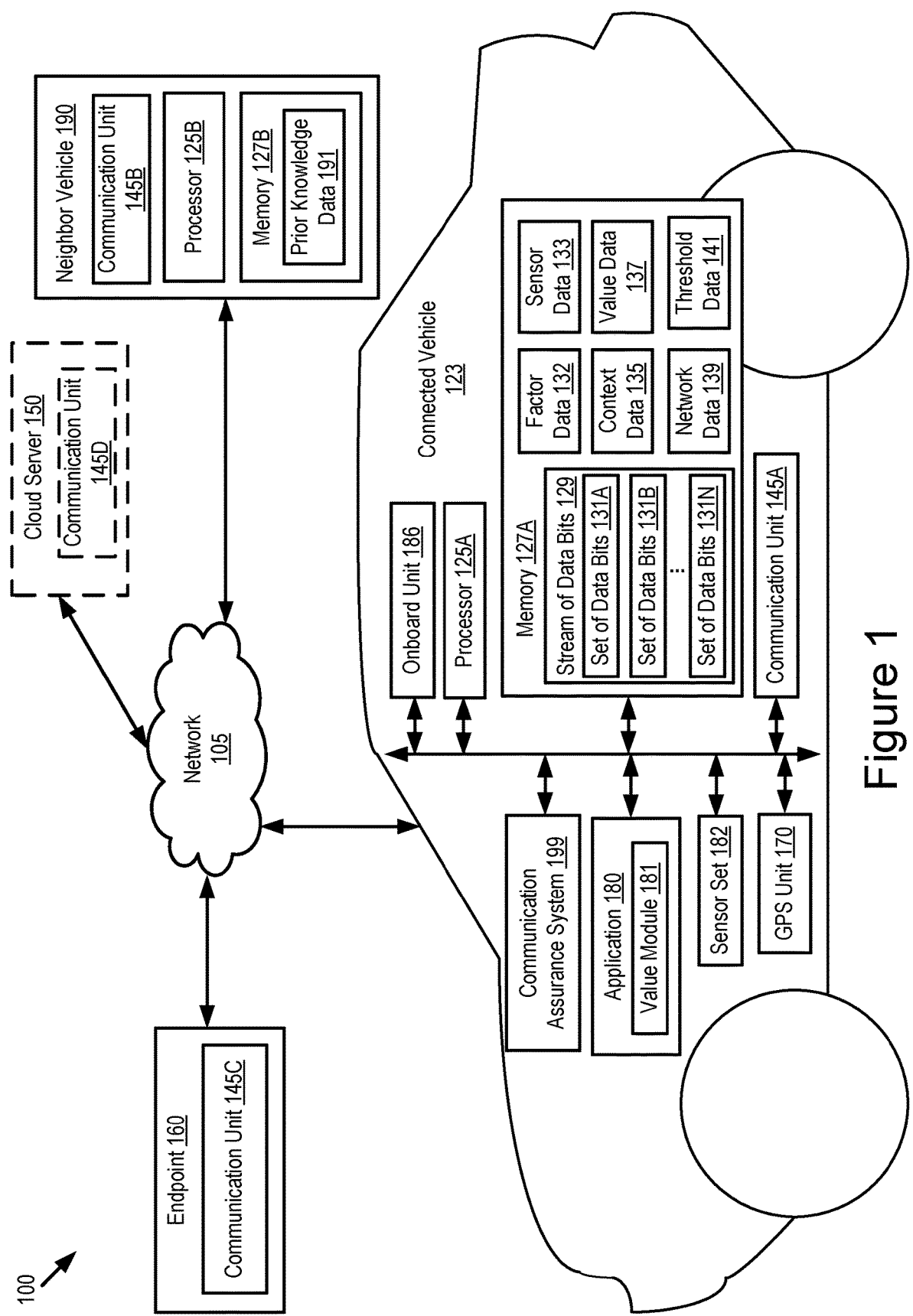
FIG. 1 is a block diagram illustrating an operating environment for a communication assurance system according to some embodiments.

Referring to FIG. 1, depicted is an operating environment 100 for a communication assurance system 199. The operating environment 100 may include one or more of the following elements: a connected vehicle 123; a neighbor vehicle 190; and an endpoint 160. Optionally, the operating environment 100 includes a cloud server 150. These elements of the operating environment 100 may be communicatively coupled to a network 105.

Although one connected vehicle 123, one neighbor vehicle 190, one cloud server 150, one endpoint 160 and one network 105 are depicted in FIG. 1, in practice the operating environment 100 may include one or more connected vehicles 123, one or more neighbor vehicles 190, one or more cloud servers 150, one or more endpoints 160 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2I; LTE-V2X, LTE-D2D, VoLTE, LTE-5G or any other mobile data network or combination of mobile data networks. Further, the network 105 may include one or more IEEE 802.11 wireless networks.

In some embodiments, the network 105 includes a V2X network. The V2X network is a communication network that enables entities such as the connected vehicle 123, the neighbor vehicle 190 and the endpoint 160 to wirelessly communicate with one another via one or more of the following: Wi-Fi; cellular including 3G, 4G, LTE, 5G, etc.; Dedicated Short Range Communication (DSRC); millimeter wave communication; etc.

In some embodiments, one or more of the connected vehicle 123 and the neighbor vehicle 190 may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the geographic position of the vehicle with lane-level accuracy. In addition, the current standard for DSRC requires that the geographic position of the vehicle be described with lane-level accuracy.

In some embodiments, devices other than vehicles may be DSRC-equipped. For example, a roadside unit (RSU) or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

As used herein, the words "geographic location," "location," "geographic position" and "position" refer to a latitude and longitude of an object such as the endpoint 160, the connected vehicle 123 or the neighbor vehicle 190. The example embodiments described herein provide positioning information that describes a geographic position of a vehicle with an accuracy of at least plus or minus 1.5 meters in relation to the actual geographic position of the vehicle. Accordingly, the example embodiments described herein are able to describe the geographic position of the vehicle with lane-level accuracy or better.

The connected vehicle 123 and the neighbor vehicle 190 may include the same or similar elements. The connected vehicle 123 and the neighbor vehicle 190 may share a connection or association. For example, the connected vehicle 123 and the neighbor vehicle 190 may share a common manufacturer (e.g., Toyota). In another example, the connected vehicle 123 and the neighbor vehicle 190 each include a communication unit such that these vehicles are "connected vehicles," where the communication unit includes any hardware and software that is needed to enable the corresponding vehicle to communicate with other entities of the operating environment 100 via the network 105.

The connected vehicle 123 and the neighbor vehicle 190 may be any type of vehicle. The connected vehicle 123 and the neighbor vehicle 190 may be the same type of vehicle relative to one another or different types of vehicles relative to one another. For example, either the connected vehicle 123 or the neighbor vehicle 190 may include one of the following types of vehicles: a car; a truck; a sports utility vehicle; a bus; a semi-truck; a drone or any other roadway-based conveyance.

In some embodiments, one or more of the connected vehicle 123 and the neighbor vehicle 190 may include an autonomous vehicle or a semi-autonomous vehicle. For example, one or more of the connected vehicle 123 and the neighbor vehicle 190 may include one or more ADAS systems. The one or more ADAS systems may provide some or all of the functionality that provides autonomous functionality.

The connected vehicle 123 includes, among other things, one or more of the following elements communicatively coupled to one another via a bus: a processor 125A; a memory 127A; a communication unit 145A; a GPS unit 170;

an application 180; a sensor set 182; an onboard unit 186; and a communication assurance system 199. In some embodiments, the connected vehicle 123 may also include one or more ADAS systems (not depicted in the figure).

In some embodiments, the processor 125A and the memory 127A may be elements of an onboard vehicle computer system. The onboard vehicle computer system may be operable to cause or control the operation of the communication assurance system 199. The onboard vehicle computer system may be operable to access and execute the data stored on the memory 127A to provide the functionality described herein for the communication assurance system 199.

The processor 125A includes an arithmetic logic unit, a microprocessor, a general-purpose controller, or some other processor array to perform computations and provide electronic display signals to a display device. The processor 125A processes data signals and may include various computing architectures including a complex instruction set computer (CISC) architecture, a reduced instruction set computer (RISC) architecture, or an architecture implementing a combination of instruction sets. The connected vehicle 123 may include one or more processors 125A. Other processors, operating systems, sensors, displays, and physical configurations may be possible.

The memory 127A stores instructions or data that may be executed by the processor 125A. The instructions or data may include code for performing the techniques described herein. The memory 127A may be a dynamic random-access memory (DRAM) device, a static random-access memory (SRAM) device, flash memory, or some other memory device. In some embodiments, the memory 127A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The connected vehicle 123 may include one or more memories 127A.

The memory 127A of the connected vehicle 123 may store one or more of the following elements: a stream 129 of data bits; factor data 132; sensor data 133; context data 135; value data 137; network data 139; and threshold data 141.

The stream 129 of data bits includes one or more sets of data bits generated by the application 180. For example, the stream 129 of data bits includes a first set 131A of data bits, a second set 131B of data bits, . . . , and an Nth set 131N of data bits. Each set of data bits included in the stream 129 describes a piece of information generated by the application 180 and includes one or more bits of data. The stream 129 of data bits, for example, includes one or more data packets.

In some embodiments, a set of data bits and a piece of information described by the set of data bits are used interchangeably. For example, as described below, each piece of information may be evaluated and assigned with a value with respect to the endpoint 160. Since each piece of information is described by a corresponding set of data bits, a value of the piece of information can also be described as a value of the corresponding set of data bits without ambiguity.

The factor data 132 includes data describing one or more value-evaluation factors. Examples of value-evaluation factors for a piece of information include, but are not limited to, one or more of the following elements: a type of an application that generates a set of data bits describing the piece of information; a type of data content described by the set of data bits; a timestamp describing when the set of data bits is generated; an importance level of the piece of information; an accuracy of the piece of information; a resolution of the piece of information; and a source of the piece of information.

The sensor data 133 includes data generated by one or more sensors of the sensor set 182. For example, the sensor data 133 includes digital data describing a roadway environment measured by the one or more sensors of the sensor set 182. The roadway environment may include not only the connected vehicle 123, but also one or more of the neighbor vehicle 190 and the endpoint 160 that are in a communication range of the connected vehicle 123.

In some embodiments, the sensor data 133 includes vehicle data of the connected vehicle 123 measured by the GPS unit 170 and one or more sensors of the sensor set 182. For example, the sensor data 133 includes data describing a speed, an acceleration, or a deceleration of the connected vehicle 123, and a location of the connected vehicle 123, etc.

The context data 135 includes digital data describing a roadway context of the endpoint 160. The context data 135 can be generated based on the sensor data 133 as described below in more details. The roadway context described by the context data includes information about a roadway environment of the endpoint 160 that describes, for example, one or more of the following elements: one or more physical roadway conditions (e.g., foggy, wet road, icy road, obstacles on the roadway, etc.); and operational information for the endpoint 160 (e.g., a speed, an acceleration, a location, historical paths of travel, etc., of the endpoint 160). In some embodiments, the context data 135 also includes data describing an expected future behavior of the endpoint 160 as estimated to occur by a context monitor 204 described below based on the sensor data 133.

In some embodiments, the context data 135 also includes prior knowledge data 191 received from the neighbor vehicle 190. The prior knowledge data 191 is described below in more details.

The value data 137 includes data describing one or more values of one or more pieces of information with respect to the endpoint 160. A value of a piece of information described herein is a value of the piece of information to the endpoint 160 that would receive the piece of information and not a value of the piece of information to the connected vehicle 123 that transmits the piece of information.

In some embodiments, for each piece of information, the value data 137 also includes (1) data describing a series of per-attribute values scores for the corresponding piece of information and (2) data describing an aggregate value score for the piece of information generated from the series of per-attribute value scores. In some embodiments, the aggregate value score for the piece of information can be considered as the value of the piece of information. The series of per-attribute value scores and the aggregate value score are described below in more details.

The network data 139 includes data describing a network condition of a V2X network that is used to transmit the stream 129 of data bits. For example, the network data 139 includes data describing that the network condition of the V2X network is congested (e.g., the network condition exceeding a first congestion threshold but less than a second congestion threshold), so that a transmission rate of the stream 129 of data bits needs to be decreased. In another example, the network data 139 includes data describing that the network condition of the V2X network is very congested (e.g., the network condition exceeding the second congestion threshold), so that there is not sufficient bandwidth to transmit all data bits in the stream 129 and some of the data bits need to be discarded.

In some embodiments, the threshold data 141 includes data describing one or more congestion thresholds (e.g., the first and second congestion thresholds described above). In some embodiments, the threshold data 141 includes data describing a value threshold. For example, if a piece of information has a value less than the value threshold, the piece of information may be discarded from the stream 129 of data bits (not transmitting to the endpoint 160). The one or more congestion thresholds and the value threshold can be predetermined or determined in real time.

For example, the threshold data 141 includes digital data that describes one or more of the following: one or more predetermined congestion thresholds for the network congestion; and a predetermined value threshold used for determining whether a set of data bits is to be discarded (e.g., a set of data bits is discarded by a data scheduler 210 described below if its assigned value does not meet this threshold for value).

The communication unit 145A transmits and receives data to and from a network 105 or to another communication channel. In some embodiments, the communication unit 145A may include a DSRC transceiver, a DSRC receiver and other hardware or software necessary to make the connected vehicle 123 a DSRC-enabled device. For example, the communication unit 145A includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication— Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the GPS unit 170 is a conventional GPS unit of the connected vehicle 123. For example, the GPS unit 170 may include hardware that wirelessly communicates with a GPS satellite to retrieve data that describes a geographic location of the connected vehicle 123. For example, the GPS unit 170 retrieves GPS data from one or more GPS satellites. In some embodiments, the GPS unit 170 is a DSRC-compliant GPS unit of the connected vehicle 123 that is operable to provide GPS data describing the geographic location of the connected vehicle 123 with lane-level accuracy.

The sensor set 182 includes one or more sensors that are operable to measure the roadway environment outside of the connected vehicle 123. For example, the sensor set 182 may include one or more sensors that record one or more physical characteristics of the road environment that is proximate to the connected vehicle 123. The memory 127A may store the sensor data 133 that describes the one or more physical characteristics recorded by the sensor set 182. The roadway environment outside of the connected vehicle 123 may include the neighbor vehicle 190 and the endpoint 160, and so, one or more sensors of the sensor set 182 may record sensor data that describes information about the neighbor vehicle 190 and the endpoint 160.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The onboard unit 186 can include one or more processors and one or more memories. For example, the onboard unit 186 includes an electronic control unit (ECU). The ECU is an embedded system in automotive electronics that controls one or more of electrical systems or subsystems in the connected vehicle 123. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the communication assurance system 199 is installed in the onboard unit 186.

Figure 4A:
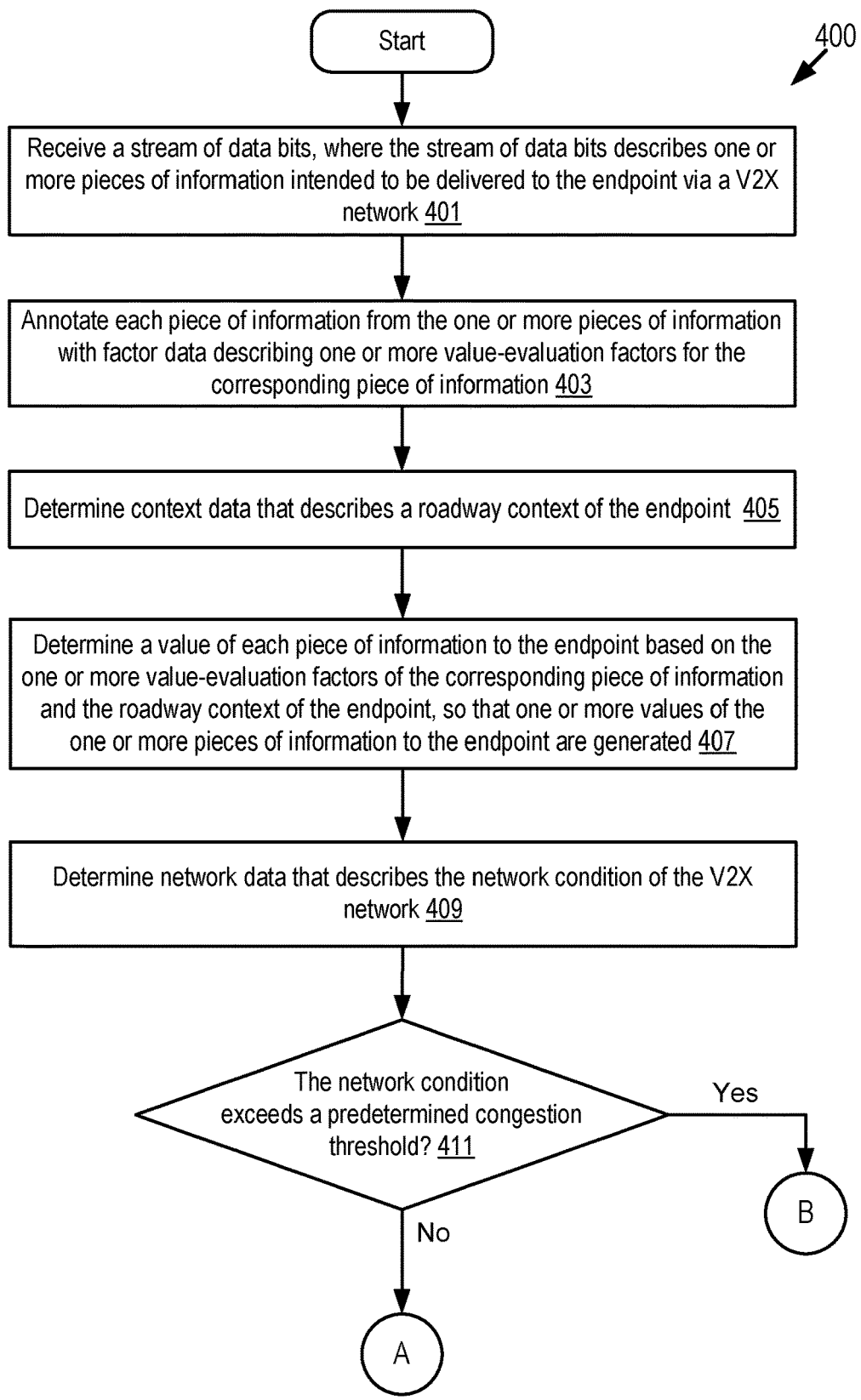
FIGS. 4A-4C depicts another method for transmitting valuable information to an endpoint reliably via a V2X network according to some embodiments.
Figure 4B:
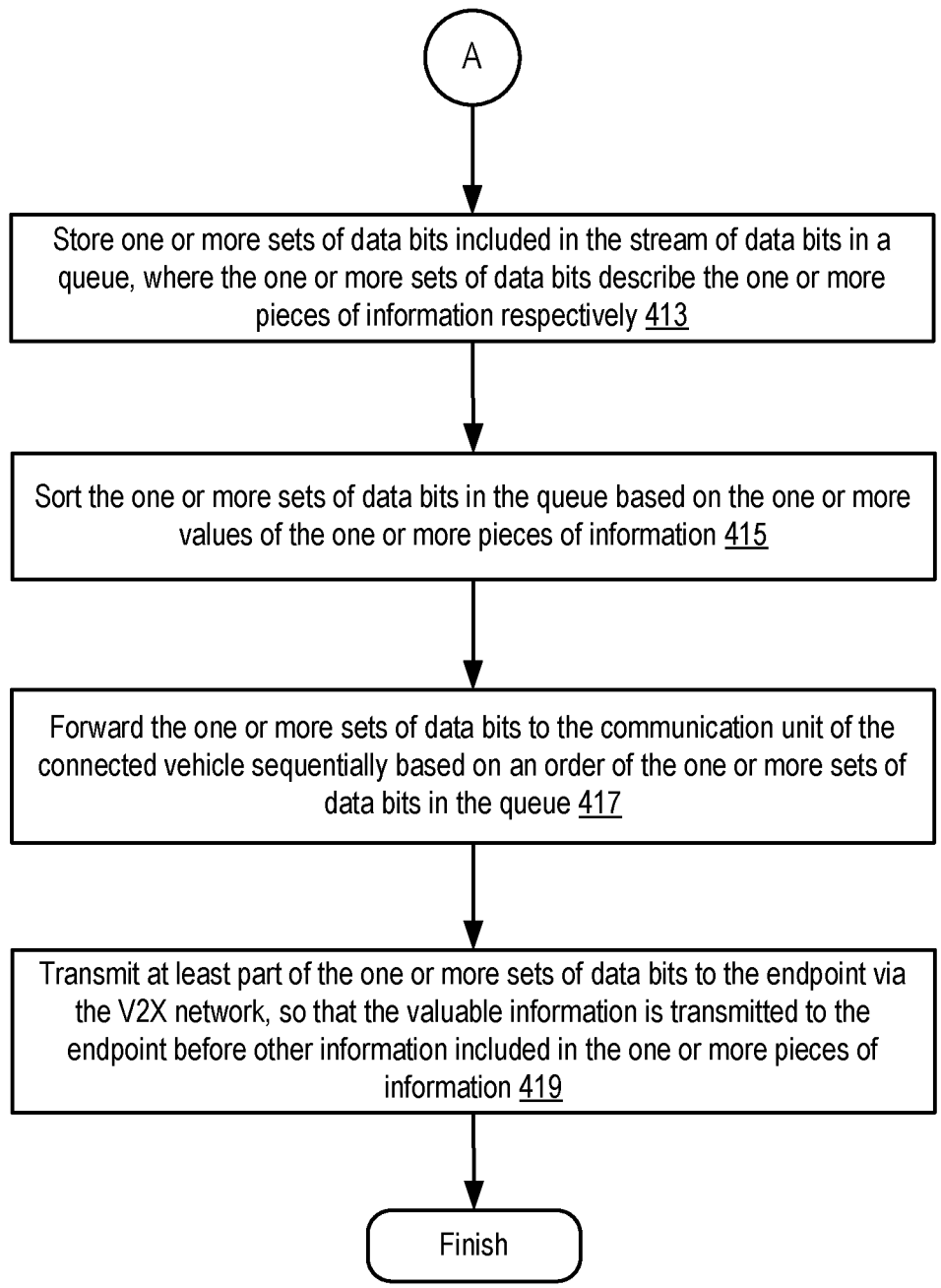
Figure 4C:
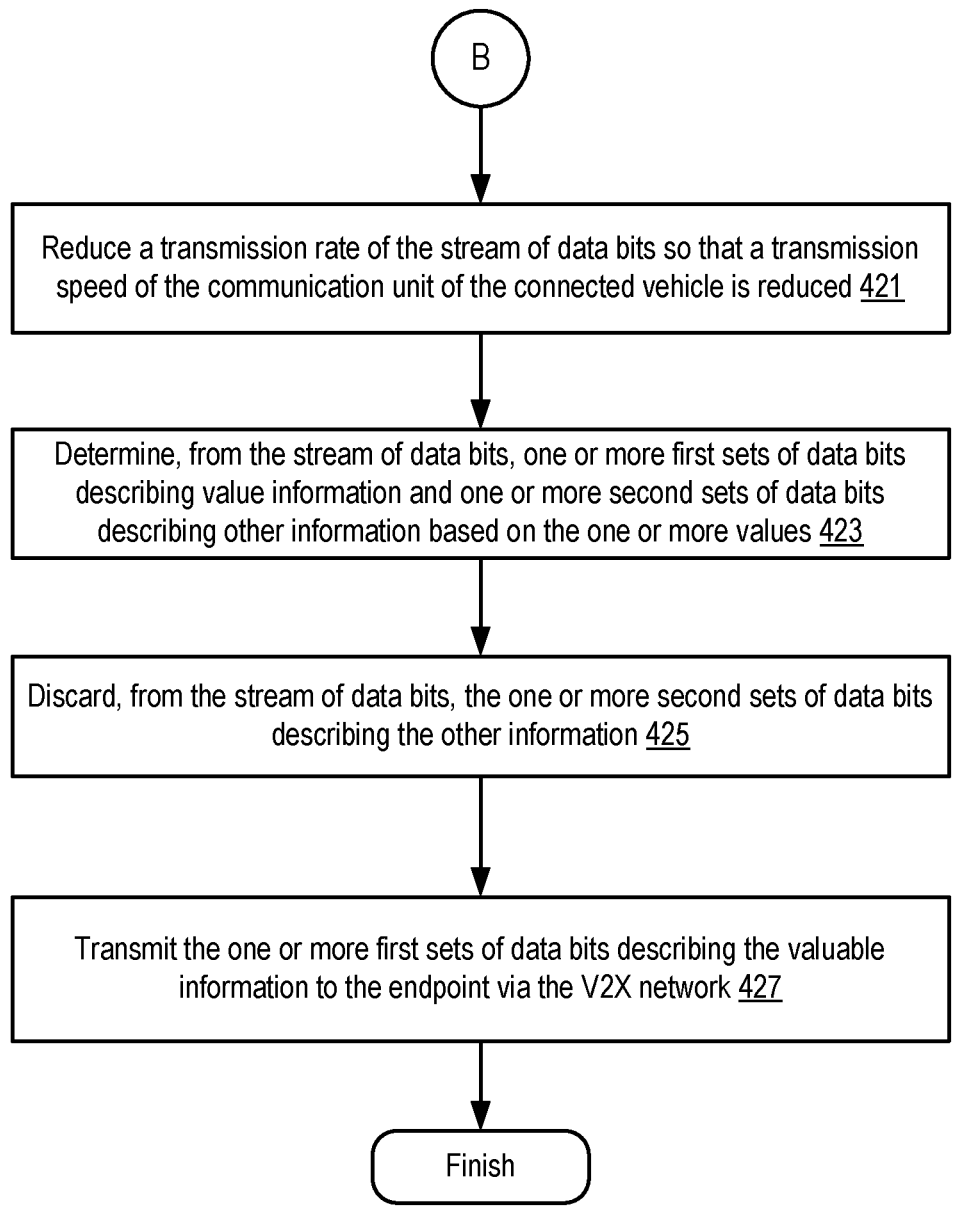
Figure 5:
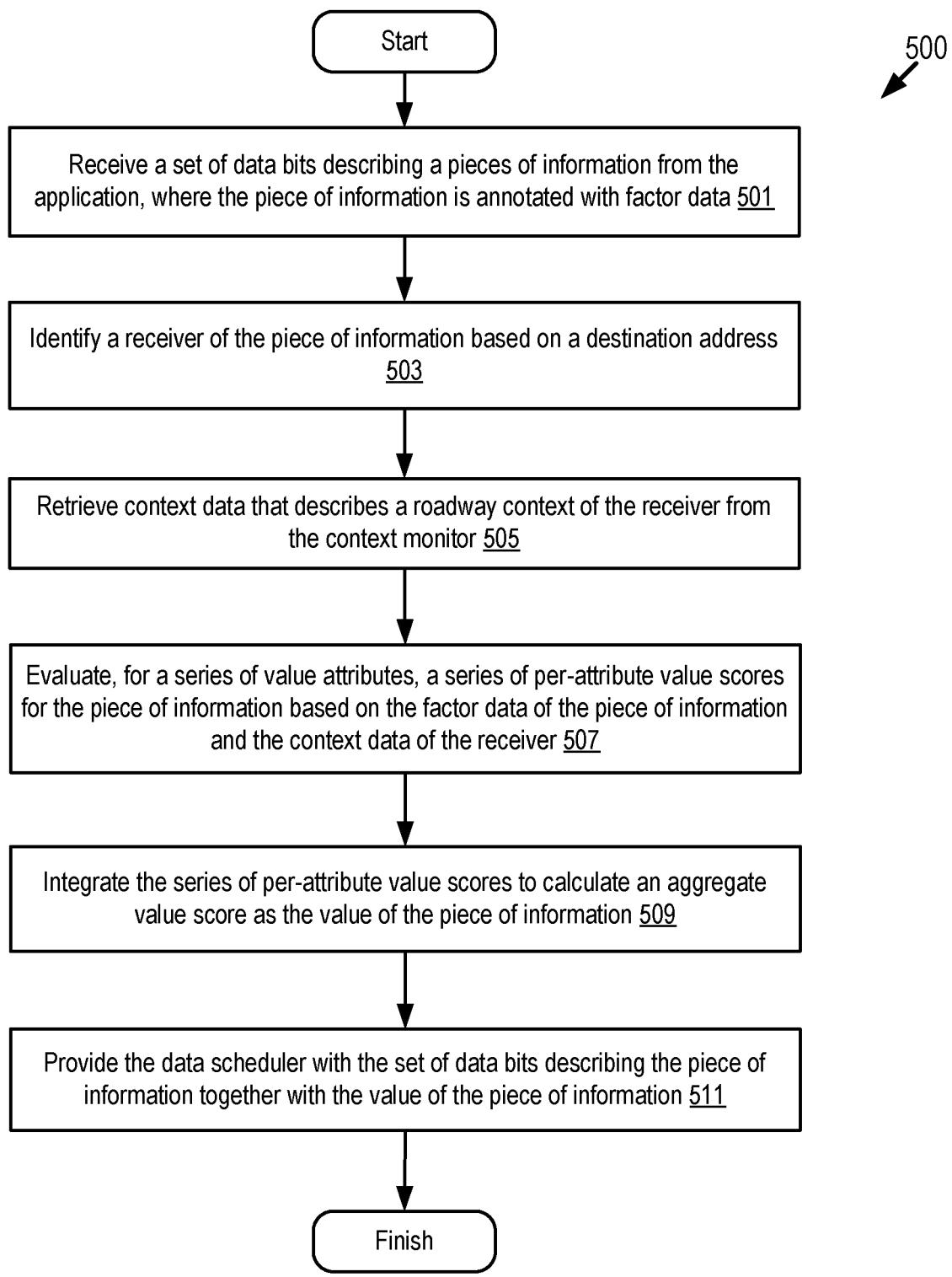
FIG. 5 depicts a method for determining a value of a piece of information to an endpoint according to some embodiments.
Figure 6:
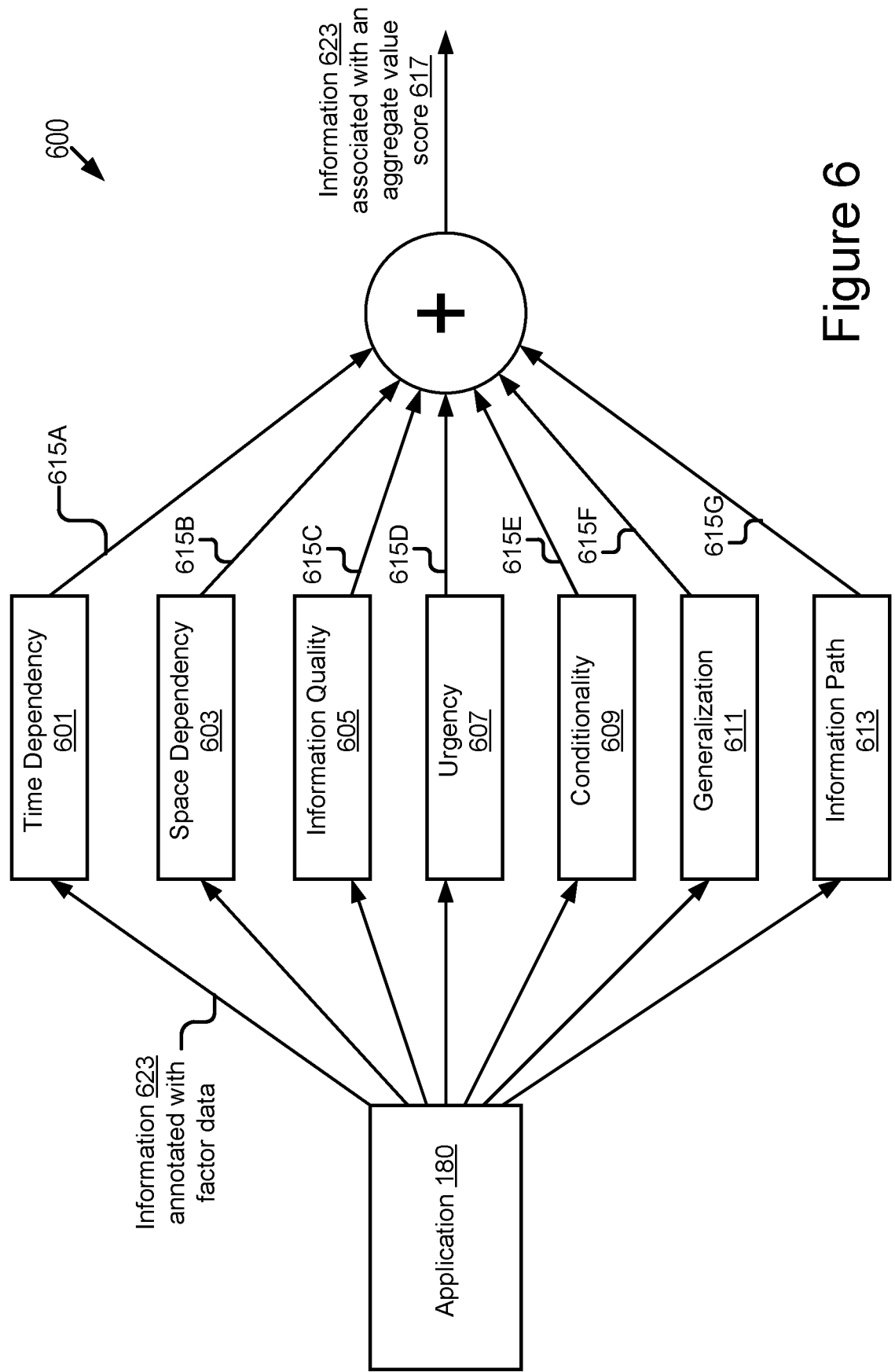
FIG. 6 is a graphical representation illustrating an example flow process for determining a value of a piece of information to an endpoint according to some embodiments.

In some embodiments, the communication assurance system 199 of the connected vehicle 123 includes software that is operable, when executed by the processor 125A, to cause the processor 125A to execute one or more steps of methods 300, 400, 500 and 700 with reference to FIGS. 3-5 and 7 and a flow process 600 with reference to FIG. 6. For example, the communication assurance system 199 is configured to transmit valuable information to the endpoint 160 reliably even in scenarios where the V2X network is congested.

As described herein, valuable information is information that is valuable to the endpoint 160. For example, the valuable information includes safety-related information that helps the endpoint 160 to operate more safely. In another example, the valuable information includes efficiency-related information that helps the endpoint 160 to operate more efficiently. In yet another example, the valuable information includes any types of information that an operator of the endpoint 160 specifies as "valuable" explicitly or implicitly.

Examples of safety-related information include, but are not limited to, one or more of the following: safety-critical information that is urgently needed by the endpoint 160 in order to avoid a safety hazard; safety-improvement information that is used by the endpoint 160 to make operation of the endpoint 160 more safely; and any other types of safety-related information.

In some embodiments, a value of a piece of information indicates whether the piece of information is valuable information with respect to the endpoint 160. For example, the valuable information includes one or more pieces of information described by one or more sets of data bits from the stream 129 of data bits, where each of the one or more pieces of information has a value greater than a value threshold. In some embodiments, the valuable information includes one or more pieces of information described by one or more sets of data bits from the stream 129 of data bits, where the one or more pieces of information have highest values (e.g., top 5 values, top 10 values, etc.) among information described by the stream of data bits.

In some embodiments, the communication assurance system 199 determines a value of each piece of information before transmitting the corresponding piece of information over a V2X network. As a result, for multiple pieces of information described by a stream of data bits, the communication assurance system 199 determines multiple values for the multiple pieces of information respectively. The communication assurance system 199 determines valuable information from the multiple pieces of information based on the multiple values, and also determines other information (e.g., less valuable information) included in the multiple pieces of information as: the other information (e.g., the less valuable information)=the multiple pieces of information—the valuable information.

The communication assurance system 199 defers or cancels transmission of the less valuable information if a network load of the V2X network is high (e.g., a network load is greater than a threshold). Suppressing the transmission of the less valuable information mitigates the network load and allows valuable information (e.g., information with higher values) to be reliably delivered over the V2X network with minimal impact on related applications.

In some embodiments, the communication assurance system 199 may be implemented using hardware including a field-programmable gate array ("FPGA") or an application-specific integrated circuit ("ASIC"). In some other embodiments, the communication assurance system 199 may be implemented using a combination of hardware and software. The communication assurance system 199 may be stored in a combination of the devices (e.g., servers or other devices), or in one of the devices.

The communication assurance system 199 is further described below with reference to FIGS. 2A-9E.

The application 180 can be any vehicular application that generates data bits shareable with the endpoint 160 via the V2X network. For example, the application 180 generates the stream 129 of data bits for transmission to the endpoint 160. Examples of the application 180 include, but are not limited to, one or more of the following: a navigation application; an infotainment system; an ADAS system; and a ride share application, etc. For example, the application 180 generates information to be transmitted over a V2X network. The information is described by data bits and can include sensor measurements, infotainment contents or any other data contents that are produced or consumed by the connected vehicle 123.

The application 180 includes a value module 181. The value module 181 includes code and routines included in the application 180 that determine, for a particular set of data bits outputted by the application 180, an instance of factor data to be assigned to the set of data bits (or equivalently, assigned to a piece of information described by the set of data bits). The factor data includes digital data that describes one or more value-evaluation factors that affect a value of the set of data bits to the endpoint 160.

The one or more value-evaluation factors for the set of data bits include one or more of the following factors: a type of the application 180; a type of the set of data bits; a timestamp describing when the set of data bits is generated; an importance level of the piece of information described by the set of data bits; an accuracy of the piece of information described by the set of data bits (e.g., if it is sensor data); a resolution of the piece of information described by the set of data bits (e.g., if it is sensor data); and a source of the piece of information described by the set of data bits.

In some embodiments, the value module 181 includes one or more additional bits of data into the set of data bits describing the piece of information, where the one or more additional bits of data describe the factor data for this set of data bits. For example, the value module 181 annotates the piece of information with the factor data which helps a value evaluator 206 described below to assess a value of the piece of information.

As depicted in FIG. 1, the neighbor vehicle 190 may include one or more of the following elements: a processor 125B; a memory 127B; and a communication unit 145B. These elements of the neighbor vehicle 190 may be communicatively coupled to one another via a bus.

The processor 125B of the neighbor vehicle 190 may have a structure similar to that of the processor 125A of the connected vehicle 123 and provides functionality similar to that of the processor 125A. Similar description for the processor 125B is not repeated here. The processor 125A and the processor 125B can be referred to as "processor 125," individually or collectively.

The memory 127B of the neighbor vehicle 190 may have a structure similar to that of the memory 127A of the connected vehicle 123 and provides functionality similar to that of the memory 127A. Similar description for the memory 127B is not repeated here. The memory 127A and the memory 127B can be referred to as "memory 127," individually or collectively.

The memory 127 of the neighbor vehicle 190 stores, for example, prior knowledge data 191. The prior knowledge data 191 describes prior knowledge of the neighbor vehicle 190 that is within a communication range of the connected vehicle 123. In some embodiments, the prior knowledge of the neighbor vehicle 190 includes information that is already known by the neighbor vehicle 190. For example, the neighbor vehicle 190 may periodically broadcast a digest of recognized objects to notify the connected vehicle 123 and other vehicles that are in the communication range of the neighbor vehicle 190.

The communication unit 145B of the connected vehicle 123, as well as a communication unit 145C of the endpoint 160 and a communication unit 145D of the cloud server 150, may have a structure similar to that of the communication unit 145A of the neighbor vehicle 190, and provides functionality similar to that of the communication unit 145A. Similar descriptions for the communication units 145B, 145C and 145D are not repeated here. The communication unit 145A, the communication unit 145B, the communication unit 145C and the communication unit 145D may be referred to as "communication unit 145," individually or collectively.

The cloud server 150 is a computing device including one or more processors and one or more memories. The cloud server 150 includes, for example, the communication unit 145D. In some embodiments, the cloud server 150 may provide any cloud-based service to one or more of the endpoint 160, the connected vehicle 123 and the neighbor vehicle 190. Examples of a cloud-based service include, but are not limited to, one or more of the following: a map service; a video streaming service; an audio streaming service; a weather broadcast service; a traffic broadcast service; a ride share service; and any other type of cloud-based services.

The endpoint 160 can be a computing device including one or more processors and one or more memories. In some embodiments, the endpoint 160 is any endpoint that (1) includes a communication unit 145 and (2) is present in a roadway environment with the connected vehicle 123. For example, the endpoint 160 is another connected vehicle, a roadside unit (RSU), or an infrastructure device including the communication unit 145. The connected vehicle 123 stores a stream of data bits that needs to be shared with the endpoint 160 via the V2X network. The stream of data bits includes any type of digital data that are shareable with the endpoint 160 by the connected vehicle 123 via a V2X wireless message that is transmitted by the connected vehicle 123. For example, some data bits in the stream of data bits are digital data that describes safety-related information urgently needed by the endpoint 160 in order to avoid a safety hazard, while some data bits in the stream of data bits do not describe safety-related information.

As depicted in FIG. 1, the endpoint 160 includes the communication unit 145C. Similar description for the communication unit 145C is not repeated here.

Example Computer System

Figure 2A:
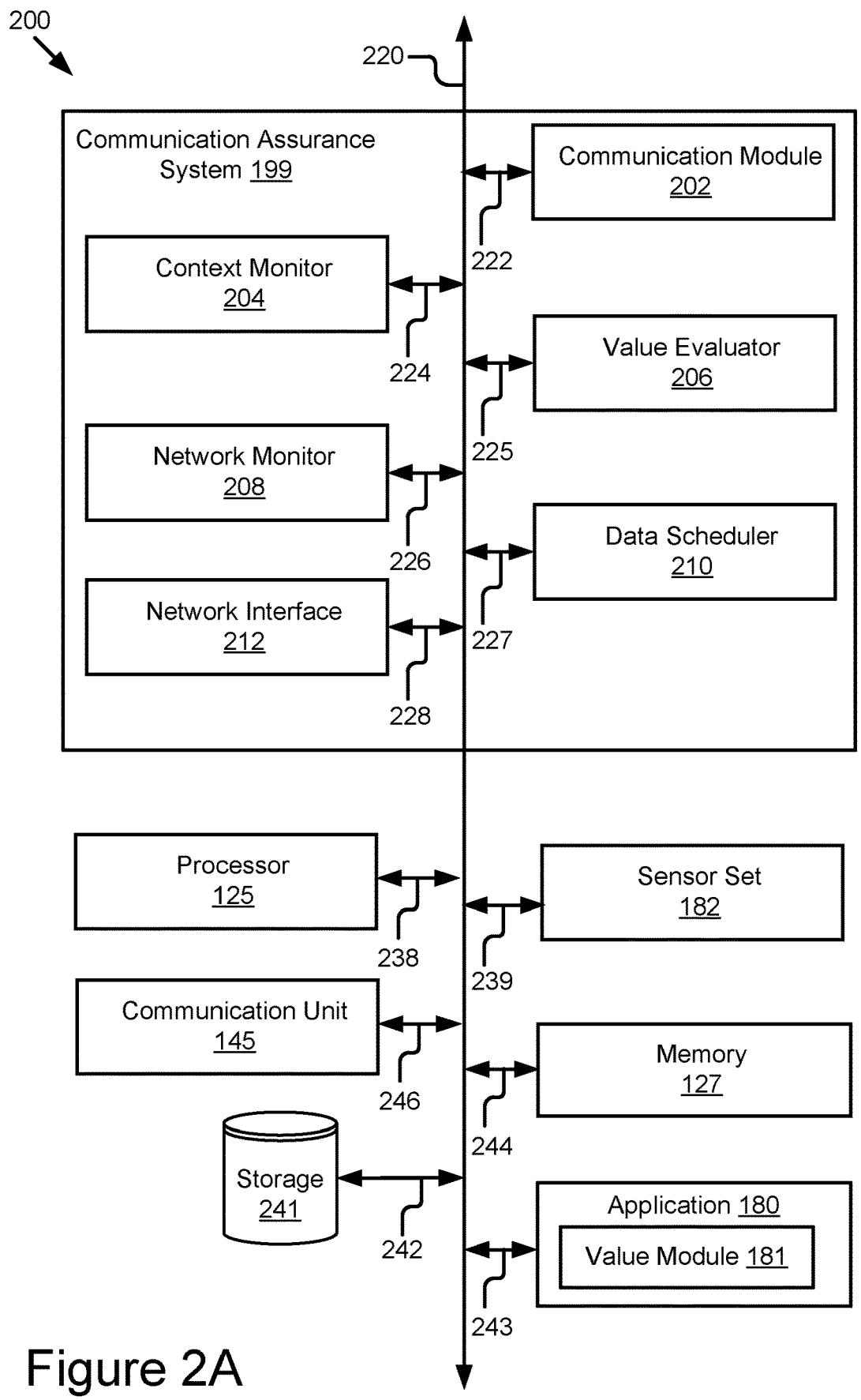
FIG. 2A is a block diagram illustrating an example computer system including a communication assurance system according to some embodiments.

Referring now to FIG. 2A, depicted is a block diagram illustrating an example computer system 200 including the communication assurance system 199 according to some embodiments. In some embodiments, the computer system 200 may include a special-purpose computer system that is programmed to perform one or more steps of methods 300, 400, 500 and 700 described below with reference to FIGS. 3-5 and 7 and a process 600 described below with reference to FIG. 6.

In some embodiments, the computer system 200 is an on-board vehicle computer of the connected vehicle 123. In some embodiments, the computer system 200 is an onboard unit of the connected vehicle 123. In some embodiments, the computer system 200 is an electronic control unit (ECU), head unit or some other processor-based computing device of the connected vehicle 123.

The computer system 200 may include one or more of the following elements according to some examples: the communication assurance system 199; the processor 125; the memory 127; the communication unit 145; the sensor set 182; the application 180; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 239. The storage 241 is communicatively coupled to the bus 220 via a signal line 242. The memory 127 is communicatively coupled to the bus 220 via a signal line 244. The application 180 is communicatively coupled to the bus 220 via a signal line 243.

The following elements of the computer system 200 are described above with reference to FIG. 1, and so, those descriptions will not be repeated here: the application 180; the communication unit 145; the sensor set 182; the processor 125; and the memory 127.

The memory 127 may store any of the data described above with reference to FIG. 1. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2A, the communication assurance system 199 includes: a communication module 202; a context monitor 204; a value evaluator 206; a network monitor 208; a data scheduler 210; and a network interface 212. These components of the communication assurance system 199 are communicatively coupled to each other via the bus 220. In some embodiments, components of the communication assurance system 199 can be stored in a single server or device. In some other embodiments, components of the communication assurance system 199 can be distributed and stored across multiple servers or devices. For example, some of the components of the communication assurance system 199 may be distributed across the endpoint 160, the cloud server 150, the neighbor vehicle 190 and the connected vehicle 123.

The communication module 202 can be software including routines for handling communications between the communication assurance system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, one or more of the following elements: the prior knowledge data 191; and the stream 129 of data bits. The communication module 202 may send or receive any of the data or messages described above with reference to FIG. 1 via the communication unit 145.

In some embodiments, the communication module 202 receives data from components of the communication assurance system 199 and stores the data in one or more of the storage 241 and the memory 127. For example, the communication module 202 receives data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the communication assurance system 199. For example, the communication module 202 may handle communications among the context monitor 204, the value evaluator 206, the network monitor 208, the data scheduler 210 and the network interface 212. Any of these modules may cause the communication module 202 to communicate with the other elements of the computer system 200 or the operating environment 100 (via the communication unit 145). For example, the context monitor 204 may use the communication module 202 to communicate with the sensor set 182 and cause the sensor set 182 to record sensor data.

The context monitor 204 can be software including routines for determining context data describing a roadway context of the endpoint 160. In some embodiments, the context monitor 204 can be stored in the memory 127 of the computer system 200 and can be accessible and executable by the processor 125. The context monitor 204 may be adapted for cooperation and communication with the processor 125 and other components of the computer system 200 via a signal line 224.

In some embodiments, the context monitor 204 is operable to cause one or more sensors in the sensor set 182 to generate sensor data. The sensor data includes digital data describing a roadway environment as measured by the one or more sensors included in the sensor set 182. The sensor set 182 includes any sensor that is operable to measure the roadway environment including, for example, one or more of the following: cameras; LIDAR; radar; range finding sensors; GPS sensors, etc. In some embodiments, part of the sensor data is received via V2X (e.g., V2I, V2V) communications with other endpoints that record sensor data describing the roadway environment, where the roadway environment includes the endpoint 160.

The context monitor 204 is operable to analyze the sensor data to generate context data based on the sensor data. The context data includes digital data that describes a roadway context of the endpoint 160. In some embodiments, the context monitor 204 is operable to continuously monitor a roadway context of the endpoint 160 and provide context data describing the roadway context to the value evaluator 206.

The roadway context described by the context data includes information about the roadway environment of the endpoint 160 that describes, for example, one or more of the following: one or more physical roadway conditions (e.g., an icy road; windy weather; a countryside (or, urban, suburban, mountain) driving environment; a speed, an acceleration, a location, historical paths of another road participant within a communication range of the endpoint 160; etc.); and operational information for the endpoint 160 (e.g., a speed, an acceleration, a location, historical paths of travel, etc., of the endpoint 160). In some embodiments, the one or more physical road conditions can be measured by onboard sensors of the connected vehicle 123. Alternatively, or additionally, the one or more physical road conditions are part of prior knowledge of one or more other neighbor vehicles 190 and can be obtained by the connected vehicle 123 through V2X communications with the one or more neighbor vehicles 190.

In some embodiments, the roadway context described by the context data includes data describing an expected future behavior of the endpoint 160 and an expected future behavior of the neighbor vehicle 190 as estimated to occur by the context monitor 204 based on the sensor data. For example, the context monitor 204 can also predict a future position, a speed, an acceleration (or a deceleration) and a future travel path of the connected vehicle 123 as well as other road participants (e.g., the neighbor vehicle 190) based on the recent roadway measurements and pre-defined prediction models. Examples of the pre-defined prediction models include, but are not limited to, a machine learning model, a neural network model, and a deep learning model, etc.

In some embodiments, the roadway context described by the context data also includes prior knowledge received from the neighbor vehicle 190 within the communication range of the connected vehicle 123. In a cooperative perception application, for example, the prior knowledge can be defined as knowledge that is already known by one or more other road participants that have been confidently recognized by the connected vehicle 123. The one or more other road participants may periodically broadcast a digest of recognized objects to notify neighboring vehicles of their knowledge, where the one or more neighboring vehicles of the one or more other road participants include the connected vehicle 123. The one or more other road participants that broadcast prior knowledge may or may not include the endpoint 160 and the neighbor vehicle 190.

The value evaluator 206 can be software including routines that, when executed by the processor 125, cause the processor 125 to determine one or more values for one or more pieces of information described by one or more sets of data bits. In some embodiments, the value evaluator 206 can be a set of instructions stored in the memory 127 of the computer system 200 and can be accessible and executable by the processor 125. The value evaluator 206 may be adapted for cooperation and communication with the processor 125 and other components of the computer system 200 via a signal line 225.

In some embodiments, the value evaluator 206 is operable to determine value data describing a value for each set of data bits outputted by the application 180. For example, for each set of data bits, the value evaluator 206 determines value data for the set of data bits based on one or more of the following: the factor data assigned to the set of data bits; and the context data describing a roadway context of the endpoint 160.

The value data for the set of data bits is digital data that describes a value of a piece of information described by the set of data bits to the endpoint 160 that would receive the set of data bits if it is transmitted by the communication assurance system 199. The value described by the value data describes a value of the set of data bits to the endpoint 160 that would receive the set of data bits, and not a value of the set of data bits to the connected vehicle 123 that transmits the set of data bits. For example, the value indicates whether the piece of information described by the set of data bits is valuable information with respect to the endpoint 160.

In some embodiments, the value evaluator 206 determines the value of the piece of information described by the set of data bits at least by: (1) evaluating, for a series of value attributes, a series of per-attribute value scores for the piece of information based on factor data describing one or more value-evaluation factors of the piece of information and context data describing a roadway context of the endpoint 160; and (2) integrating the series of per-attribute value scores to calculate an aggregate value score as the value of the piece of information. Further details for operations performed by the value evaluator 206 to determine a value of a piece of information are described below with reference to FIGS. 5-9E.

In some examples, the value evaluator 206 integrates the series of per-attribute value scores to calculate the aggregate value score by taking an average of the series of per-attribute value scores, so that the aggregate value score is the average of the series of per-attribute value scores.

In some examples, the value evaluator 206 integrates the series of per-attribute value scores to calculate the aggregate value score at least by: executing an analytic hierarchy process to calculate the aggregate value score for the piece of information based on the series of per-attribute value scores. For example, the value evaluator 206 determines an application-dependent weight for each value attribute from the series of value attributes, and calculates a weighted average of the series of per-attribute value scores as the aggregate value score for the corresponding piece of information based on the corresponding application-dependent weight of each value attribute. Further details for the analytic hierarchy process are described below with reference to FIGS. 7-9E.

In some embodiments, the series of value attributes includes one or more of: a time dependency attribute; a space dependency attribute; an information quality attribute; a conditionality attribute; a generalizability attribute; an urgency attribute; and an information path attribute. Further details for the series of value attributes are described below with reference to FIG. 6.

The network monitor 208 can be software including routines that, when executed by the processor 125, cause the processor 125 to monitor a network condition of a V2X network that is used to transmit a stream of data bits to the endpoint 160. In some embodiments, the network monitor 208 can be a set of instructions stored in the memory 127 of the computer system 200 and can be accessible and executable by the processor 125. The network monitor 208 may be adapted for cooperation and communication with the processor 125 and other components of the computer system 200 via a signal line 226.

In some embodiments, the network monitor 208 is operable to monitor the network interface 212 to determine network data describing a current network condition (e.g., a current congestion condition) of a V2X network that is used for transmitting the stream of data bits to the endpoint 160. For example, the network monitor 208 continuously monitors a network condition of each type of V2X networks available to the connected vehicle 123, and then provides the data scheduler 210 with network data that describes an up-to-date condition of each available V2X network.

Examples of a network condition for a V2X network include, but are not limited to, one or more of the following: a network load (e.g., a load of the V2X network being 20%, 40%, 80%, 100%, etc.); a channel occupancy ratio of each V2X channel of the V2X network (i.e., a ratio of time when a V2X channel is busy such as "10%, 20%, or 30%, etc., of the time when the V2X channel is not available"); and latency of one or more recent data packets, etc. Each data packet can include one or more sets of data bits.

The data scheduler 210 can be software including routines that, when executed by the processor 125, cause the processor 125 to perform a communication-assurance action on a stream of data bits. In some embodiments, the data scheduler 210 can be a set of instructions stored in the memory 127 of the computer system 200 and can be accessible and executable by the processor 125. The data scheduler 210 may be adapted for cooperation and communication with the processor 125 and other components of the computer system 200 via a signal line 227.

In some embodiments, the data scheduler 210 receives a stream of data bits, as well as one or more values associated with one or more pieces of information described by the stream of data bits, from the value evaluator 206. The data scheduler 210 receives network data describing a network condition of the V2X network. The data scheduler 210 implements a communication-assurance action on the stream of data bits based on the one or more values and the network condition of the V2X network.

For example, the data scheduler 210 stores one or more sets of data bits included in the stream of data bits in a queue, where the one or more sets of data bits describe the one or more pieces of information respectively. The data scheduler 210 sorts the one or more sets of data bits in the queue based on the one or more values of the one or more pieces of information (e.g., the data scheduler 210 sorts the one or more sets of data bits in a descending order of the one or more values). The data scheduler 210 sequentially forwards the one or more sets of data bits to the network interface 212 for transmission based on an order of the one or more sets of data bits in the queue, so that the communication unit 145 of the connected vehicle 123 is configured to transmit the valuable information included in the one or more pieces of information to the endpoint 160 before other information included in the one or more pieces of information.

In some embodiments, the one or more values of the one or more sets of data bits are time-varying, the data scheduler 210 instructs the value evaluator 206 to periodically update the one or more values for the one or more sets of data bits in the queue, so that an order of the one or more sets of data bits in the queue is also updated based on the updated values. If a value of a piece of information drops below a certain lower bound, the data scheduler 210 removes a set of data bits describing the piece of information from the queue to cancel transmission of the set of data bits.

In some embodiments, the data scheduler 210 is operable to determine whether a current network condition (e.g., a current congestion condition) of the V2X network exceeds a predetermined congestion threshold. Responsive to the network condition of the V2X network exceeding a predetermined congestion threshold, the data scheduler 210 triggers one or more remedial actions to be performed on the stream of data bits. For example, the data scheduler 210 determines whether a load of the V2X network exceeds a predetermined threshold; and responsive to the load of the V2X network exceeding the predetermined threshold, the data scheduler 210 triggers execution of one or more remedial actions. In another example, the data scheduler 210 determines whether an available bandwidth of the V2X network is below a predetermined bandwidth threshold; and responsive to the available bandwidth of the V2X network being smaller than the predetermined bandwidth threshold, the data scheduler 210 triggers execution of one or more remedial actions.

The one or more remedial actions include one or more of: reducing a transmission rate of the stream of data bits so that a forwarding speed of the stream of data bits to the network interface 212 is also reduced, which causes a transmission speed of the communication unit 145 of the connected vehicle 123 to be decreased; and discarding, from the stream of data bits, one or more sets of data bits based on the one or more values so that one or more remaining sets of data bits describing the valuable information are forwarded to the network interface 212 for transmission, which causes the communication unit 145 of the connected vehicle 123 to transmit the one or more remaining sets of data bits to the endpoint 160 via the V2X network.

For example, responsive to the network condition of the V2X network exceeding a first congestion threshold but less than a second congestion threshold (e.g., which indicates that the network condition is congested), the data scheduler 210 executes a remedial action to reduce a transmission rate of the stream of data bits. In another example, responsive to the network condition exceeding the second congestion threshold (e.g., which indicates that the network condition is very congested and there is not sufficient bandwidth to transmit all data bits in the stream), the data scheduler 210 executes a remedial action to discard, from the stream of data bits, one or more sets of data bits based on the one or more values so that only one or more remaining sets of data bits describing the valuable information are transmitted to the endpoint 160.

In some embodiments, the one or more remedial actions also include implementing a hybrid networking configuration so that one or more network interfaces corresponding to one or more types of V2X networks are selected to transmit the valuable information to the endpoint 160 in parallel. For example, the communication unit 145 of the connected vehicle 123 is capable of using multiple types of V2X networks in parallel. In a hybrid networking configuration, the data scheduler 210 selects one or more optimal V2X networks to transmit the one or more remaining sets of data bits based on a corresponding value of each remaining set of data bits (e.g., a set of data bits with a higher value being transmitted before another set of data bits having a lower value), where the one or more optimal V2X networks are determined based on a network condition of each V2X network.

For example, the one or more optimal V2X networks may be one or more V2X networks that correspond to the most suitable network interface(s) to transmit data bits, and the data scheduler 210 selects the most suitable network interface(s) to transmit the one or more remaining sets of data bits to the endpoint 160.

In another example, the one or more optimal V2X networks may be one or more available V2X networks that has the highest available bandwidths or lowest network loads, and the data scheduler 210 selects one or more network interfaces corresponding to the one or more optimal V2X networks to transmit the one or more remaining sets of data bits to the endpoint 160.

In yet another example, the data scheduler 210 may select one or more optimal V2X networks corresponding to one or more network interfaces with (i) higher available bandwidths, (ii) lower radio frequencies or (iii) a combination thereof for transmitting the valuable information, so that the valuable information is delivered to the endpoint 160 more reliably.

In some embodiments, in order to improve the probability of successful data delivery, the one or more remedial action also include one or more of the following: (i) transmitting the valuable information multiple times (via a single type of V2X networks or multiple types of V2X networks); and (ii) sending the valuable information over multiple types of V2X networks corresponding to multiple types of network interfaces in parallel. Other example remedial actions are possible.

In some embodiments, the one or more remaining sets of data bits that describe the valuable information each correspond to a value greater than that of each of the one or more sets of data bits to be discarded that describe other information included in the one or more pieces of information. For example, the data scheduler 210 is operable to determine one or more sets of data bits to discard (i.e., not to transmit via the V2X network) based on their values relative to the one or more remaining sets of data bits and an available bandwidth of the V2X network, where the available bandwidth of the V2X network is determined based on the current network congestion condition. In a further example, assume that the stream of data bits includes 10 sets of data bits and an available bandwidth of the V2X network allows transmission of 5 sets of data bits. The data scheduler 210 determines to discard the last 5 sets of data bits that have the 5 smallest values and to keep the top 5 sets of data bits that have the 5 greatest values to be transmitted to the endpoint 160.

In some embodiments, the one or more remaining sets of data bits that describe the valuable information each correspond to a value greater than a predetermined value threshold, and the one or more sets of data bits to be discarded that describe other information included in the one or more pieces of information each correspond to a value less than the predetermined value threshold. For example, the valuable information to be transmitted to the endpoint 160 has values greater than or equal to the predetermined value threshold, and the other information to be discarded has values less than the predetermined value threshold.

In some embodiments, the data scheduler 210 causes the network interface 212 to modify an operation of the communication unit 145 of the connected vehicle 123 based on the communication-assurance action so that the valuable information included in the stream of data bits is reliably delivered to the endpoint even in a scenario where the V2X network is congested. For example, responsive to the data scheduler 210 taking a remedial action to reduce a transmission rate of the stream of data bits, the network interface 212 reduces a transmission speed of the communication unit 145 of the connected vehicle 123. In another example, responsive to the data scheduler 210 taking a remedial action to discard, from the stream of data bits, one or more sets of data bits, the network interface 212 instructs the communication unit 145 of the connected vehicle 123 only to transmit the one or more remaining sets of data bits that describe the valuable information to the endpoint 160 via the V2X network.

The network interface 212 can be software including routines that, when executed by the processor 125, cause the processor 125 to transmit data bits to the endpoint 160 via the V2X network. In some embodiments, the network interface 212 can be a set of instructions stored in the memory 127 of the computer system 200 and can be accessible and executable by the processor 125. The network interface 212 may be adapted for cooperation and communication with the processor 125 and other components of the computer system 200 via a signal line 228.

In some embodiments, the network interface 212 can be implemented using hardware or a combination of hardware and software.

In some embodiments, the network interface 212 provides data bits received from the data scheduler 210 to the communication unit 145 of the connected vehicle 123. For example, the network interface 212 is operable to cause the communication unit 145 to transmit the one or more remaining sets of data bits to the endpoint 160 via the V2X network. The one or more remaining sets of data bits can be transmitted via one or more V2X wireless messages. In some embodiments, the network interface 212 is an element of the communication unit 145. The network interface 212 includes various V2X channels that are analyzable to determine a network congestion condition of each of these V2X channels by the network monitor 208.

In some embodiments, the connected vehicle 123 can work with any types of wireless network technology for V2X communications (e.g., DSRC, LTE, Wi-Fi, C-V2X, mmWave communications, etc.). The network interface 212 has one type of network interfaces or multiple types of network interfaces in parallel (i.e., hybrid networking), and so, it is possible to use one type of network interfaces or multiple types of network interfaces in parallel to transmit the data bits. In this case, the data scheduler 210 selects the most suitable network interface(s) to transmit each set of data bits. For example, responsive to the data scheduler 210 taking a remedial action to implement a hybrid networking configuration, one or more optimal V2X networks corresponding to one or more network interfaces are selected, and the one or more network interfaces are activated by the data scheduler 210 to transmit the valuable information to the endpoint 160 via the communication unit 145 in parallel.

Figure 2B:
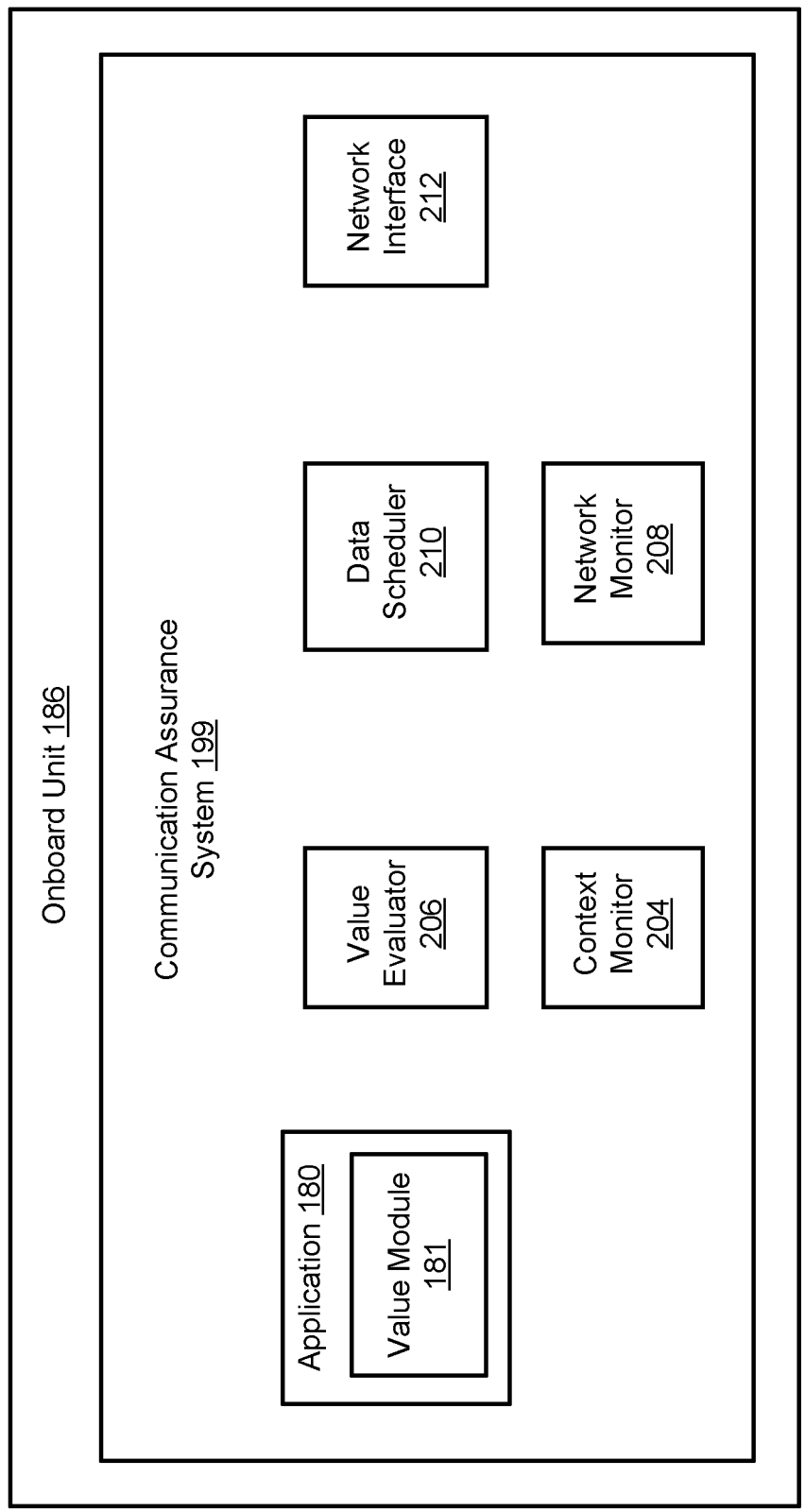
FIG. 2B is a block diagram illustrating a communication assurance system according to some embodiments.

FIG. 2B is a block diagram illustrating the communication assurance system 199 according to some embodiments. The communication assurance system 199 can be installed in the onboard unit 186. The communication assurance system 199 includes, for example, the application 180 (which includes the value module 181), the context monitor 204, the value evaluator 206, the network monitor 208, the data scheduler 210 and the network interface 212.

Example Processes

Figure 2C:
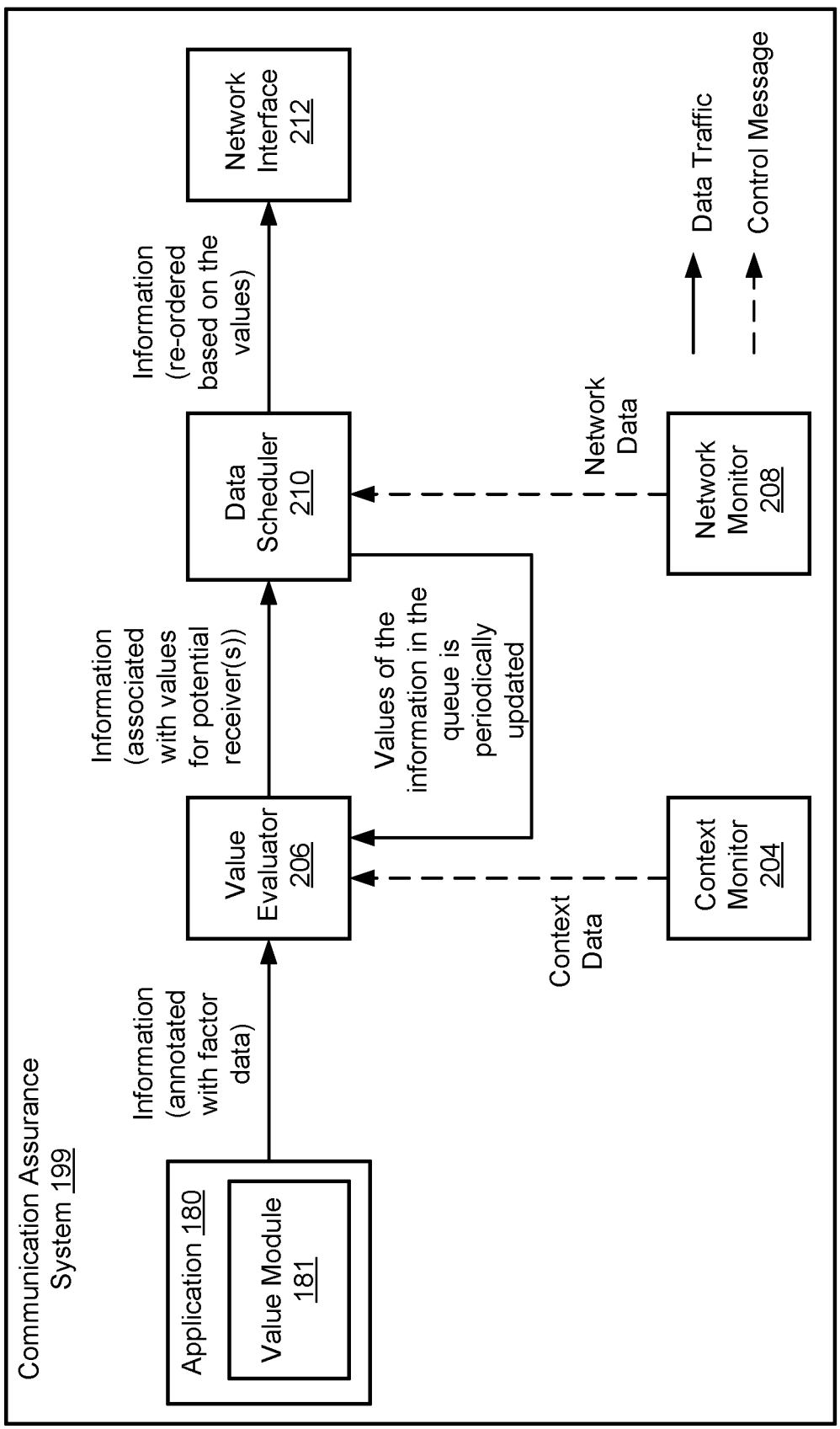
FIG. 2C is a block diagram illustrating a flow process performed by a communication assurance system for reliably transmitting valuable information to an endpoint via a V2X network according to some embodiments.

FIG. 2C is a block diagram illustrating a flow process performed by the communication assurance system 199 for reliably transmitting valuable information to the endpoint 160 via a V2X network according to some embodiments. The steps of the flow process are executable in any order, and not necessarily the order depicted in FIG. 2C.

In some embodiments, the application 180 generates a stream of data bits that includes one or more sets of data bits describing one or more pieces of information. The value module 181 annotates each piece of information with factor data describing one or more value-evaluation factors for the corresponding piece of information, so that one or more sets of factor data are generated for the one or more pieces of information. The application 180 sends the stream of data bits annotated with the one or more sets of factor data to the value evaluator 206.

The context monitor 204 determines context data describing a roadway context of a potential receiver of the stream of data bits and sends the context data to the value evaluator 206. For example, the potential receiver can be the endpoint 160. The value evaluator 206 determines one or more values for the one or more pieces of information based on the context data and the one or more sets of factor data, respectively. The value evaluator 206 sends the stream of data bits (including the one or more sets of data bits describing the one or more pieces of information) together with the one or more values to the data scheduler 210.

The network monitor 208 determines network data describing a current network condition (e.g., a current congestion condition) of the V2X network and sends the network data to the data scheduler 210. The data scheduler 210 implements a communication-assurance action on the stream of data bits based on the one or more values and the network data. For example, the data scheduler 210 sorts the one or more sets of data bits in the stream based on the one or more values and discards any set of data bits from the queue whose value is smaller than a lower bound. In some embodiments, the data scheduler 210 instructs the value evaluator 206 to periodically update the one or more values of the one or more sets of data bits in the queue.

The data scheduler 210 may also perform one or more remedial actions on the stream of data bits based on the one or more values and the current network condition as described above with reference to FIG. 2A. For example, the data scheduler 210 discards a subset of data bits describing less valuable information from the stream of data bits and sends a subset of remaining data bits describing valuable information to the network interface 212 for transmission to the endpoint 160.

Figure 3:
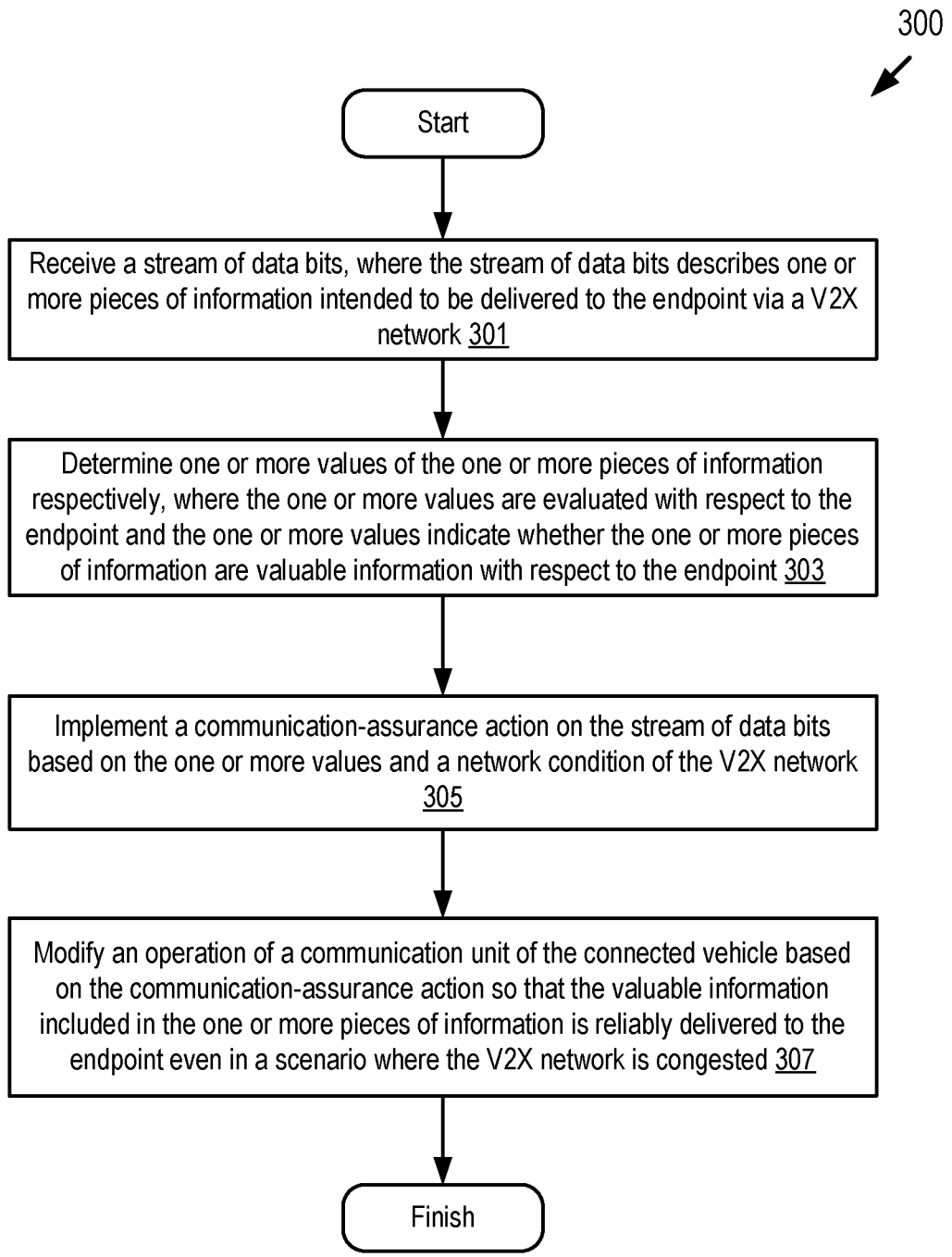
FIG. 3 depicts a method for transmitting valuable information to an endpoint reliably via a V2X network according to some embodiments.

Referring now to FIG. 3, depicted is a flowchart of an example method 300 for reliably transmitting valuable information from the connected vehicle 123 to the endpoint 160 via a V2X network according to some embodiments. The steps of the method 300 are executable in any order, and not necessarily the order depicted in FIG. 3.

At step 301, the communication module 202 receives a stream of data bits from the application 180, where the stream of data bits describes one or more pieces of information intended to be delivered to the endpoint 160 via a V2X network.

At step 303, the value evaluator 206 determines one or more values of the one or more pieces of information respectively, where the one or more values are evaluated with respect to the endpoint 160 and the one or more values indicate whether the one or more pieces of information are valuable information with respect to the endpoint 160.

At step 305, the data scheduler 210 implements a communication-assurance action on the stream of data bits based on the one or more values and a network condition of the V2X network.

At step 307, the network interface 212 modifies an operation of the communication unit 145 of the connected vehicle 123 based on the communication-assurance action so that the valuable information included in the one or more pieces of information is reliably delivered to the endpoint 160 even in a scenario where the V2X network is congested.

FIGS. 4A-4C depict another method 400 for reliably transmitting valuable information from the connected vehicle 123 to the endpoint 160 via a V2X network according to some embodiments. The steps of the method 400 are executable in any order, and not necessarily the order depicted in FIGS. 4A-4C.

Referring to FIG. 4A, at step 401, the communication module 202 receives a stream of data bits from the application 180, where the stream of data bits describes one or more pieces of information intended to be delivered to the endpoint 160 via a V2X network.

At step 403, the value module 181 annotates each piece of information from the one or more pieces of information with factor data describing one or more value-evaluation factors for the corresponding piece of information.

At step 405, the context monitor 204 determines context data that describes a roadway context of the endpoint 160.

At step 407, the value evaluator 206 determines a value of each piece of information to the endpoint 160 based on the one or more value-evaluation factors of the corresponding piece of information and the roadway context of the endpoint 160. In this way, one or more values of the one or more pieces of information are generated.

At step 409, the network monitor 208 determines network data that describes the network condition of the V2X network.

At step 411, the data scheduler 210 determines whether the network condition exceeds a predetermined congestion threshold. Responsive to the network condition exceeding the predetermined congestion threshold, the method 400 moves to step 421 at FIG. 4C. Otherwise, the method 400 moves to step 413 at FIG. 4B.

Referring to FIG. 4B, at step 413, the data scheduler 210 stores one or more sets of data bits included in the stream of data bits in a queue, where the one or more sets of data bits describe the one or more pieces of information respectively.

At 415, the data scheduler 210 sorts the one or more sets of data bits in the queue based on the one or more values of the one or more pieces of information.

At step 417, the data scheduler 210 forwards the one or more sets of data bits to the communication unit 145 of the connected vehicle 123 sequentially based on an order of the one or more sets of data bits in the queue. For example, the data scheduler 210 forwards the one or more sets of data bits to the communication unit 145 via the network interface 212.

At step 419, the communication unit 145 of the connected vehicle 123 transmits at least part of the one or more sets of data bits to the endpoint 160 via the V2X network, so that valuable information included in the one or more pieces of information is transmitted to the endpoint 160 before other information in the one or more pieces of information.

Referring to FIG. 4C, at step 421, responsive to the network condition exceeding the predetermined congestion threshold, the data scheduler 210 reduces a transmission rate of the stream of data bits so that a transmission speed of the communication unit 145 of the connected vehicle 123 is reduced.

At step 423, the data scheduler 210 determines, from the stream of data bits, one or more first sets of data bits describing value information and one or more second sets of data bits describing other information based on the one or more values. For example, the one or more first sets of data bits that describe the valuable information each correspond to a value greater than a predetermined value threshold, and the one or more second sets of data bits to be discarded each correspond to a value less than the predetermined value threshold. In another example, the one or more first sets of data bits that describe the valuable information each correspond to a value greater than that of each of the one or more second sets of data bits to be discarded.

At step 425, the data scheduler 210 discards, from the stream of data bits, the one or more second sets of data bits describing the other information. The data scheduler 210 forwards the one or more first sets of data bits to the communication unit 145 of the connected vehicle 123 via the network interface 212.

At step 427, the communication unit 145 of the connected vehicle 123 transmits the one or more first sets of data bits describing the valuable information to the endpoint 160 via the V2X network.

FIG. 5 depicts a method 500 for determining a value of a piece of information to the endpoint 160 according to some embodiments. The steps of the method 500 are executable in any order, and not necessarily the order depicted in FIG. 5.

At step 501, the value evaluator 206 receives a set of data bits describing a piece of information from the application 180, where the piece of information is annotated with factor data.

At step 503, the value evaluator 206 identifies a receiver of the piece of information based on a destination address of the piece of information. Without loss of generality, assume that the receiver is the endpoint 160. For example, the destination address can be an address of the endpoint 160 such as a media access control (MAC) address, a phone number, an Internet Protocol (IP) address, or an email address, etc., of the endpoint 160. In another example, the destination address is a broadcast address.

At step 505, the value evaluator 206 retrieves context data that describes a roadway context of the receiver from the context monitor 204.

At step 507, the value evaluator 206 evaluates, for a series of value attributes, a series of per-attribute value scores for the piece of information based on the factor data of the piece of information and the context data of the receiver. The series of value attributes and the series of per-attribute value scores are described below with reference to FIG. 6.

At step 509, the value evaluator 206 integrates the series of per-attribute value scores to calculate an aggregate value score as the value of the piece of information. Calculation of the aggregate value score is described below with reference to FIGS. 7-9E.

At step 511, the value evaluator 206 provides the data scheduler 210 with the set of data bits describing the piece of information together with the value of the piece of information.

FIG. 6 is a graphical representation illustrating an example flow process 600 for determining a value of a piece of information to the endpoint 160 according to some embodiments.

An overview of the flow process 600 is described here. For example, the value evaluator 206 takes the following elements as inputs: (1) a set of data bits describing a piece of information 623 annotated with factor data of the piece of information 623 from the application 180; and (2) context data from the context monitor 204. The value evaluator 206 infers a value of the piece of the information for a potential receiver (e.g., the endpoint 160) under a given roadway context of the receiver described by the context data. The value evaluator 206 is operable so that the value is assessed based on multiple value attributes. The value evaluator 206 is programmed to include a per-attribute value function for each value attribute. The value evaluator 206 initially evaluates a series of per-attribute value scores using these per-attribute value functions, and then integrates the resulting per-attribute value scores to determine an aggregate value score.

The flow process 600 illustrates a value assessment process based on per-attribute value functions for various value attributes or a subset of the various attributes. The various value attributes include, but are not limited to, the following elements: a time dependency attribute 601; a space dependency attribute 603; an information quality attribute 605; an urgency attribute 607; a conditionality attribute 609; a generalizability attribute 611; and an information path attribute 613; etc.

The time dependency attribute 601 represents freshness of a piece of information. For example, the time dependency attribute 601 indicates that a value of the piece of information is time dependent or time-varying. That is, a value of the piece of information can decay as time elapses since the piece of information is generated. For example, information describing vehicle positions as of 10 seconds ago can be useless for collision warning applications because the information is already outdated.

An example per-attribute value function for the time dependency attribute 601 (e.g., a time-dependency value function) includes a decreasing function of the elapsed time since the piece of information is generated. For example, based on this example time-dependency value function, a first piece of information having a longer elapsed time since it is generated has a smaller time-dependency value score than a second piece of information having a shorter elapsed time.

By taking the piece of information 623 as an example, the time-dependency value function can be used to calculate a time-dependency value score 615A for the piece of information 623 with respect to the time dependency attribute 601.

The space dependency attribute 603 indicates that a value of a piece of information has a spatial dependence. That is, the piece of information has an application-dependent spatial horizon where it is valuable for a potential receiver. For example, for collision warning applications, driving behaviors of close-by vehicles may be more valuable than driving behaviors of farther vehicles. An example per-attribute value function for the space dependency attribute 603 (e.g., a space-dependency value function) includes a decreasing function of a geographical distance from the connected vehicle 123 to a receiver. Other factors, such as a vehicle speed and direction, and lanes on which the vehicles are located, etc., can also be input variables of the space-dependency value function.

By taking the piece of information 623 as an example, the space-dependency value function can be used to calculate a space-dependency value score 615B for the piece of information 623 with respect to the space dependency attribute 603.

The information quality attribute 605 indicates that a value of a piece of information depends on a quality of the piece of information 623. That is, the value can get lower when the quality of the piece of information is not satisfactory for applications.

In a first example scenario: for collision warning applications, vehicle position information with less position errors may have greater values for a potential receiver. An example per-attribute value function for the information quality attribute 605 (e.g., an example information-quality value function) includes a decreasing function of the expected position errors provided by a positioning system (e.g., a GPS unit).

In a second example scenario: for a cooperative perception application, sensor measurements with a higher resolution, a wider field of view or a combination thereof can be considered more valuable. In some examples, the field of view may be defined in a static manner based on hardware specifications of onboard sensors (as assumed in Cooperative Perception Messages). In some other examples, a dynamic field of view is considered by taking occlusion by road objects into account. An example information-quality value function includes an increasing function of sensor resolution, a field of view or a combination thereof. For example, based on this example information-quality value function, a first piece of information describing sensor measurements with a higher sensor resolution has a greater information-quality value score than a second piece of information describing sensor measurements with a lower sensor resolution.

By taking the piece of information 623 as an example, the information-quality value function can be used to calculate an information-quality value score 615C for the piece of information 623 with respect to the information quality attribute 605.

The urgency attribute 607 indicates that applications may explicitly specify an importance level of each piece of information, and a piece of information with a higher importance level may have a higher value. For example, an application assigns three levels of importance to each piece of information (i.e., "optional," "neutral," and "important"). An example per-attribute value function for the urgency attribute 607 (e.g., an urgency value function) includes an increasing function of a specified importance level of a piece of information.

By taking the piece of information 623 as an example, the urgency value function can be used to calculate an urgency value score 615D for the piece of information 623 with respect to the urgency attribute 607.

The conditionality attribute 609 indicates that: if a piece of information cannot be easily inferred from existing knowledge of a potential receiver, then the piece of information may have a higher value. For example, a collision warning application is considered below. Given that a vehicle (Vehicle A) receives a data packet (including a stream of data bits), where the data packet includes a position, a speed, and an acceleration of another vehicle (Vehicle B). Vehicle A can predict a future path of Vehicle B for a short period of time (e.g., using a prediction model such as a constant acceleration model) based on the data packet. Thus, further updates from Vehicle B can be less valuable for Vehicle A during this period of time, unless Vehicle B suddenly accelerates or decelerates.

An example per-attribute value function (e.g., a conditionality value function) includes an increasing function of a difference between a predicted roadway context of the receiver and an actual roadway context of the receiver. In some embodiments, both a sender (e.g., the connected vehicle 123) and the receiver are assumed to share the same prediction model.

By taking the piece of information 623 as an example, the conditionality value function can be used to calculate a conditionality value score 615E for the piece of information 623 with respect to the conditionality attribute 609.

The generalizability attribute 611 indicates that if a piece of information is general and applicable to more applications, it may have a higher value. For example, information that can be used by a larger number of applications can be more valuable, as the information is beneficial to all these applications. In an example scenario, assume that an onboard unit of a vehicle runs a collision warning application and a see-through application in parallel. Vehicle positions obtained by a GPS unit are used by both the collision warning application and the see-through application, while camera images are used only by the see-through application. In that case, the value evaluator 206 may consider that the GPS readings are more valuable than the camera images.

An example per-attribute value function for the generalizability attribute 611 (e.g., a generalizability value function) includes an increasing function of the number of applications that use the piece of information.

By taking the piece of information 623 as example, the generalizability value function can be used to calculate a generalizability value score 615F for the piece of information 623 with respect to the generalizability attribute 611.

The information path attribute 613 indicates that a value of a piece of information relates to credibility of an information source and a communication path followed by the piece of information. In a first example scenario: information that comes from secure communication channels can be more valuable than those coming from unsecure channels, as the information from secure channels has lower risks of tampering. An example per-attribute value function (e.g., an information-path value function) includes a binary function that assigns 1 as an information-path value score if the information comes from a secure channel and assigns 0 as the information-path value score otherwise.

In a second example scenario: assume that a vehicle detects and localizes surrounding road participants by multiple types of onboard sensors (e.g., radar, LIDAR, camera, etc.). A piece of information describing an object that is consistently detected by multiple sensors can have a higher value, as it can be regarded more credible. An example information-path value function includes an increasing function of the number of sensors that detect a same object described by the piece of information.

In a third example scenario: a cooperative perception application where multiple connected vehicles exchange positions of pedestrians that are detected by their own onboard sensors is considered. Information describing position measurements that are consistent with many other vehicles' measurements may have higher values, as it can be regarded more credible. An example information-path value function includes an increasing function of the number of vehicles that detect a same object described by the information.

By taking the piece of information 623 as an example, the information-path value function can be used to calculate an information-path value score 615G for the piece of information 623 with respect to the information path attribute 613.

By using per-attribute value functions described above, the value evaluator 206 calculates a series of per-attribute value scores for the piece of information 623 based on the series of value attributes (or, the value evaluator 206 calculates per-attribute value scores for the piece of information 623 based on a subset of the series of value attributes). The series of per-attribute value scores for the piece of information 623 includes one or more of the following: the time-dependency value score 615A; the space-dependency value score 615B; the information-quality value score 615C; the urgency value score 615D; the conditionality value score 615E; the generalizability value score 615F; and the information-path value score 615G. Alternatively, the series of per-attribute value scores for the piece of information 623 can also be calculated by performing operations similar to those described below with reference to FIGS. 9C-9D.

After calculating the per-attribute value scores, the value evaluator 206 integrates these per-attribute value scores to derive an aggregate value score 617 for the piece of information 623. For example, a straightforward way of score aggregation is to calculate an average of the per-attribute value scores by the value evaluator 206. That is, depending on which value attributes are used to calculate the per-attribute value scores, the aggregate value score 617 is an average of one or more of the following: the time-dependency value score 615A; the space-dependency value score 615B; the information-quality value score 615C; the urgency value score 615D; the conditionality value score 615E; the generalizability value score 615F; and the information-path value score 615G.

In some embodiments, the value evaluator 206 determines an application-dependent weight for each value attribute. For example, the value evaluator 206 performs operations similar to those described below with reference to FIGS. 9A-9B to determine a series of application dependent weights for the series of value attributes, respectively. The value evaluator 206 calculates a weighted average of the series of per-attribute value scores as the aggregate value score 617 for the piece of information 623 based on the series of application-dependent weights. For example, the value evaluator 206 determines the aggregate value score 617 by: summing up the series of per-attribute value scores using the series of application-dependent weights to generate a weighted sum; and taking an average of the weighted sum to be the aggregate value score 617. Alternatively, the value evaluator 206 can take the weighted sum as the aggregate value score 617, rather than the average of the weighted sum.

The value evaluator 206 may use an analytic hierarchy process to perform score aggregation, which is described below in more details with reference to FIGS. 7-9E.

Figure 7:
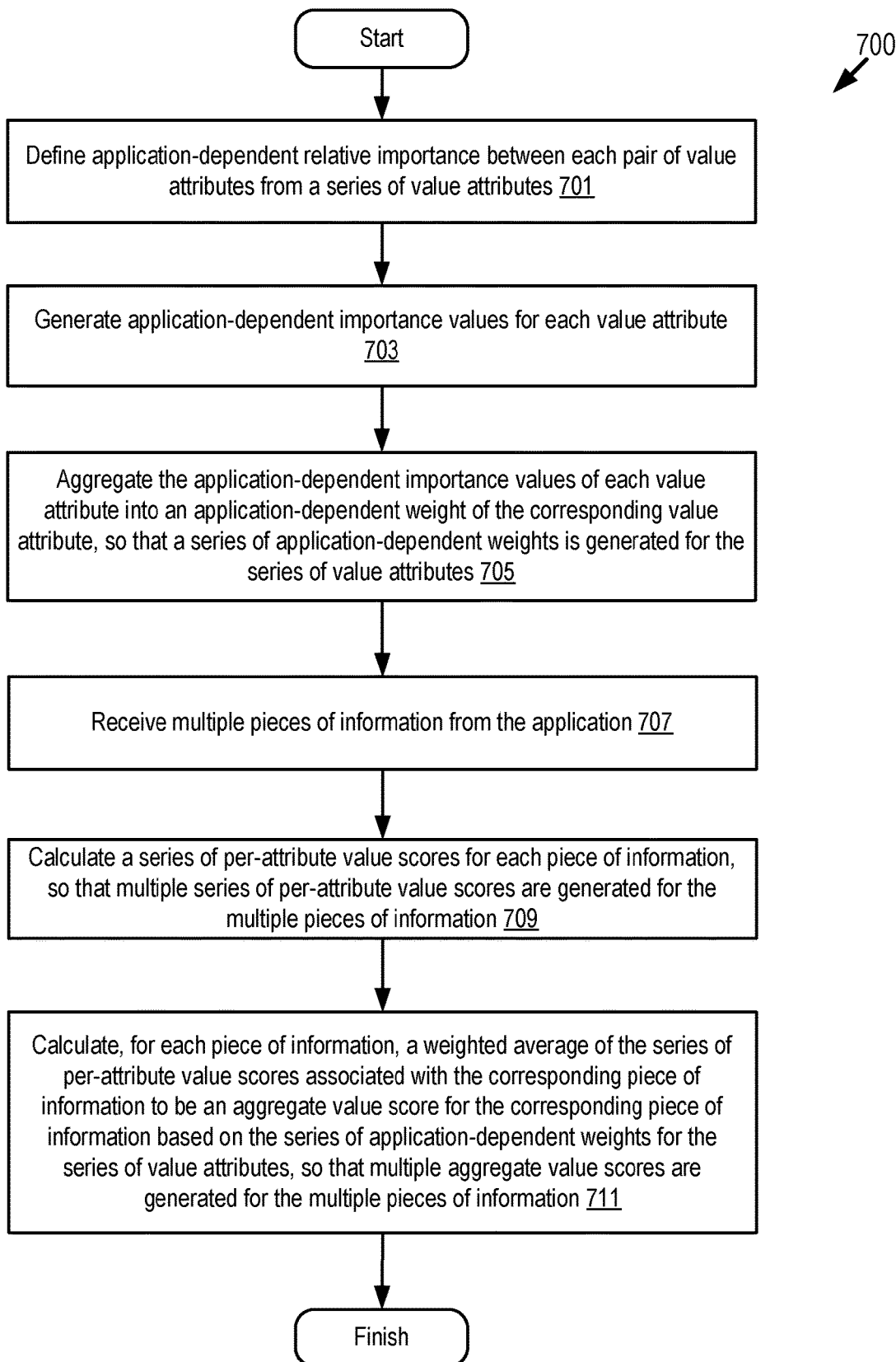
FIG. 7 depicts a method for executing an analytic hierarchy process to calculate an aggregate value score for a piece of information according to some embodiments.

FIG. 7 depicts a method 700 for executing an analytic hierarchy process to calculate an aggregate value score for a piece of information according to some embodiments. The steps of the method 700 are executable in any order, and not necessarily the order depicted in FIG. 7. In the following, FIG. 7 is described in combined reference with FIGS. 8A-9E. In some embodiments, steps 701-705 can be performed offline during a preparation phase, while steps 707-711 can be performed online during an operation phase.

Depending on a type of an application, each per-attribute value score may have different importance. For example, for safety applications, a value score based on time dependency (e.g., a time-dependency value score) may have a higher importance level than a generalizability value score. As a result, multiple per-attribute value scores may be weighted accordingly in an aggregation process.

The analytic hierarchy process described here is beneficial because, for example, it provides a systematic way of making a decision by balancing multiple (possibly conflicting) objective functions. For example, the analytic hierarchy process can handle any number of value attributes to derive an aggregate result.

In some embodiments, to utilize humans' ability to deal better with pair-wise comparisons, one or more domain experts can pre-assign relative importance between each pair of value attributes. Alternatively, or additionally, the value evaluator 206 can utilize one or more machine learning methods (e.g., a neural network) to determine the relative importance between each pair of value attributes. The value evaluator 206 then calculates an aggregate value score of each piece of information (which represents aggregated importance of each piece of information) based on a series of pair-wise relative importance scores.

Referring to FIG. 7, at step 701, the value evaluator 206 defines application-dependent relative importance between each pair of value attributes from a series of value attributes. For example, the value evaluator 206 may take inputs from domain experts and define the application-dependent relative importance between each pair of value attributes based on the inputs. In another example, the value evaluator 206 can utilize one or more machine learning methods to determine relative importance between each pair of value attributes.

At step 703, the value evaluator 206 generates application-dependent importance values for each value attribute based on the defined application-dependent relative importance between each pair of value attributes. For example, the value evaluator 206 populates an importance comparison matrix with the application-dependent importance values of each value attribute based on the defined application-dependent relative importance between each pair of value attributes.

An example importance comparison matrix 800 is depicted in FIG. 8A. The importance comparison matrix 800 is filled with application-dependent importance values for various value attributes. For example, the importance comparison matrix 800 is related to a safety application and includes pair-wise comparison of importance values for a time dependency attribute, a space dependency attribute, and an information quality attribute. The importance comparison matrix 800 may also be filled with application-dependent importance values for other value attributes such as those depicted in FIG. 6.

Assume that the value evaluator 206 defines the following Items (1)-(6) at step 701 for safety applications:

Item (1): application-dependent relative importance between a pair of the time dependency attribute and the space dependency attribute describes that the time dependency attribute is $\alpha$ times more important than the space dependency attribute;

Item (2) (equivalent to item (1)): the space dependency attribute is $\alpha$ times less important than the time dependency attribute;

Item (3): application-dependent relative importance between a pair of the time dependency attribute and the information quality attribute describes that the time dependency attribute is $\beta$ times more important than the information quality attribute;

Item (4) (equivalent to Item (3)): the information quality attribute is $\beta$ times less important than the time dependency attribute;

Item (5): application-dependent relative importance between a pair of the information quality attribute and the space dependency attribute describes that the space dependency attribute is $\gamma$ times more important than the information quality attribute; and Item (6) (equivalent to Item (5)): the information quality attribute is $\gamma$ times less important than the space dependency attribute.

A first row of the importance comparison matrix 800 lists application-dependent importance values for the time dependency attribute and based on the above Items (1) and (3), the first row is filled with "1," "$\alpha$" and "$\beta$," respectively. A second row of the importance comparison matrix 800 lists application-dependent importance values for the space dependency attribute and based on the above Items (2) and (5), the second row is filled with "$1/\alpha$," "1" and "$\gamma$," respectively. A third row of the importance comparison matrix 800 lists application-dependent importance values for the information quality attribute and based on the above Items (3) and (6), the third row is filled with "$1/\beta$," "$1/\gamma$" and "1," respectively.

The symbols "$\alpha$," "$\beta$" and "$\gamma$" may represent scale values for the relative importance, and can have values 1, 3, 5, 7 or 9 according to a table 810 in FIG. 8B that lists relative importance based on a Saaty scale. For example, if the time dependency attribute is moderately more important than the space dependency attribute, then in Items (1) and (2), a=3 (e.g., in table 810, "moderate" corresponds to a scale of "3"). In another example, if the time dependency attribute is strongly more important than the space dependency attribute, then in Items (1) and (2), a=5 (e.g., in table 810, "strong" corresponds to a scale of "5"). In some embodiments, the symbols "$\alpha$," "$\beta$" and "$\gamma$" may have other scale values which are not listed out in the table 810 of FIG. 8B.

A specific example importance comparison matrix 900 for the importance comparison matrix 800 of FIG. 8A is depicted in FIG. 9A. In FIG. 9A, example relative importance assignment for a safety application includes: (1) the time dependency attribute and the space dependency attribute are equally important (e.g., $\alpha=1$); (2) the time dependency attribute is moderately more important than the information quality attribute (e.g., $\beta=3$); and (3) the information quality attribute is moderately less important than the space dependency attribute (e.g., $1/\gamma=\frac{1}{3}$). The importance comparison matrix 900 is generated according to the importance comparison matrix 800 with $\alpha=1$, $\beta=3$ and $\gamma=3$.

Turning back to FIG. 7, at step 705, the value evaluator 206 aggregates the application-dependent importance values of each value attribute into an application-dependent weight of the corresponding value attribute, so that a series of application-dependent weights is generated for the series of value attributes. For example, the value evaluator 206 converts the application-dependent importance values of each value attribute into a normalized weight for the value attribute. The normalized weight serves as the application-dependent weight for the value attribute.

Specifically, based on the importance comparison matrix generated at step 703, the value evaluator 206 constructs a weight calculation matrix. The weight calculation matrix includes the importance comparison matrix in addition to (1) a first additional column listing out a sum of importance values for each attribute and (2) a second additional column listing out a normalized weight for each attribute.

For example, referring to FIG. 9B, an example weight calculation matrix 910 based on the importance comparison matrix 900 of FIG. 9A is depicted. In the "Sum" column, a sum of importance values for the time dependency attribute is calculated as 5, a sum of importance values for the space dependency attribute is calculated as 5, and a sum of importance values for the information quality attribute is calculated as $\frac{5}{3}$. An application-dependent weight for the time dependency attribute with respect to the safety application is generated by performing a normalization operation on the sum of importance values of the time dependency attribute: $5/(5+5+\frac{5}{3})=0.43$. Similarly, an application-dependent weight for the space dependency attribute with respect to the safety application is generated by performing a normalization operation on the sum of importance values of the space dependency attribute: $5/(5+5+\frac{5}{3})=0.43$; and an application-dependent weight for the information quality attribute with respect to the safety application is generated by performing a normalization operation on the sum of importance values of the information quality attribute: $(\frac{5}{3})/(5+5+\frac{5}{3})=0.14$.

Turning back to FIG. 7, at step 707, the value evaluator 206 receives multiple pieces of information from the application 180.

At step 709, the value evaluator 206 calculates a series of per-attribute value scores for each piece of information, so that multiple series of per-attribute value scores are generated for the multiple pieces of information.

Specifically, for each value attribute, the value evaluator 206 performs pair-wise comparison of relative values of each pair of information (e.g., every two pieces of information or each two pieces of information). In some embodiments, per-attribute value functions described above can be used to calculate the relative values between each pair of information. Alternatively, the value evaluator 206 may take inputs from domain experts to assign relative values based on the Saaty scale for each pair of information. Next, the value evaluator 206 converts the relative values of each pair of information into normalized values for the pair of information, where the normalized values serve as the per-attribute score values for the pair of information.

For example, with reference to FIG. 9C, two pieces of information (Information A and Information B) are received from the application 180. An example information comparison matrix 920 for the time dependency attribute is depicted in FIG. 9C. The information comparison matrix 920 is filled with relative values for Information A and Information B with respect to the time dependency attribute. For example, the information comparison matrix 920 is related to a safety application and includes pair-wise comparison of relative values for the time dependency attribute. Assume that Information A is 2 times more valuable in terms of freshness (e.g., an example of the time dependency attribute) than Information B. Then, a first row of the information comparison matrix 920 is filled with relative values "1" and "2" respectively for Information A. Equivalently, Information B is 2 times less valuable in terms of freshness than Information A, and then, a second row of the information comparison matrix 920 is filled with relative values "½" and "1" respectively for Information B.

For example, with reference to FIG. 9C, an example information comparison matrix 922 for the space dependency attribute is depicted. The information comparison matrix 922 is filled with relative values for Information A and Information B with respect to the space dependency attribute. For example, the information comparison matrix 922 is related to a safety application and includes pair-wise comparison of relative values for the space dependency attribute. Assume that Information A is 3 times more valuable in terms of closeness of an information source (e.g., an example of the space dependency attribute) than Information B. Then, a first row of the information comparison matrix 922 is filled with relative values "1" and "3" respectively for Information A. Equivalently, Information B is 3 times less valuable in terms of closeness of the information source than Information A, and then, a second row of the information comparison matrix 922 is filled with relative values "⅓" and "1" respectively for Information B.

For example, with reference to FIG. 9C, an example information comparison matrix 924 for the information quality attribute is depicted. The information comparison matrix 924 is filled with relative values for Information A and Information B with respect to the information quality attribute. For example, the information comparison matrix 924 is related to a safety application and includes pair-wise comparison of relative values for the information quality attribute. Assume that Information A is 5 times more valuable in terms of information quality than Information B. Then, a first row of the information comparison matrix 924 is filled with relative values "1" and "5" respectively for Information A. Equivalently, Information B is 5 times less valuable in terms of information quality than Information A, and then, a second row of the information comparison matrix 924 is filled with relative values "⅕" and "1" respectively for Information B.

Next, based on the information comparison matrices 920, 922 and 924 of FIG. 9C, the value evaluator 206 constructs value score calculation matrices 930, 932 and 934 of FIG. 9D, respectively. Per-attribute values scores are assigned to each piece of information respectively using the value score calculation matrices 930, 932 and 934. Each value score calculation matrix in FIG. 9D includes a corresponding information comparison matrix in addition to (1) a first additional column listing out a sum of relative values for each piece of information in the pair and (2) a second additional column listing out a normalized value for each piece of information (which serves as an aggregate value score for the piece of information).

For example, referring to FIG. 9D, an example value score calculation matrix 930 for the time dependency attribute based on the information comparison matrix 920 of FIG. 9C is depicted. In the "Sum" column, a sum of relative values for Information A is calculated as 3, and a sum of relative values for Information B is calculated as 3/2. Per-attribute value scores for Information A and Information B based on the time dependency attribute with respect to the safety application are generated by respectively performing a normalization operation on the sum of relative values of Information A and the sum of relative values of Information B: 3/(3+3/2)=0.67 for Information A; and (3/2)/(3+3/2)=0.33 for Information B.

For example, referring to FIG. 9D, an example value score calculation matrix 932 for the space dependency attribute based on the information comparison matrix 922 of FIG. 9C is depicted. In the "Sum" column, a sum of relative values for Information A is calculated as 4, and a sum of relative values for Information B is calculated as 4/3. Per-attribute value scores for Information A and Information B based on the space dependency attribute with respect to the safety application are generated by respectively performing a normalization operation on the sum of relative values of Information A and the sum of relative values of Information B: 4/(4+4/3)=0.75 for Information A; and (4/3)/(4+4/3)=0.25 for Information B.

For example, referring to FIG. 9D, an example value score calculation matrix 934 for the information quality attribute based on the information comparison matrix 924 of FIG. 9C is depicted. In the "Sum" column, a sum of relative values for Information A is calculated as 6, and a sum of relative values for Information B is calculated as 6/5. Per-attribute value scores for Information A and Information B based on the information quality attribute with respect to the safety application are generated by respectively performing a normalization operation on the sum of relative values of Information A and the sum of relative values of Information B: 6/(6+6/5)=0.83 for Information A; and (6/5)/(6+6/5)=0.17 for Information B.

Turning back to FIG. 7 again, at step 711, the value evaluator 206 calculates, for each piece of information, a weighted average of the series of per-attribute value scores associated with the corresponding piece of information based on the series of application-dependent weights for the series of value attributes. The weighted average serves as an aggregate value score for the corresponding piece of information. Alternatively, the value evaluator 206 calculates, for each piece of information, a weighted sum of the series of per-attribute value scores associated with the corresponding piece of information based on the series of application-dependent weights for the series of value attributes. The weighted sum serves as an aggregate value score for the corresponding piece of information.

In this way, multiple aggregate value scores are generated for the multiple pieces of information.

Figure 9E:
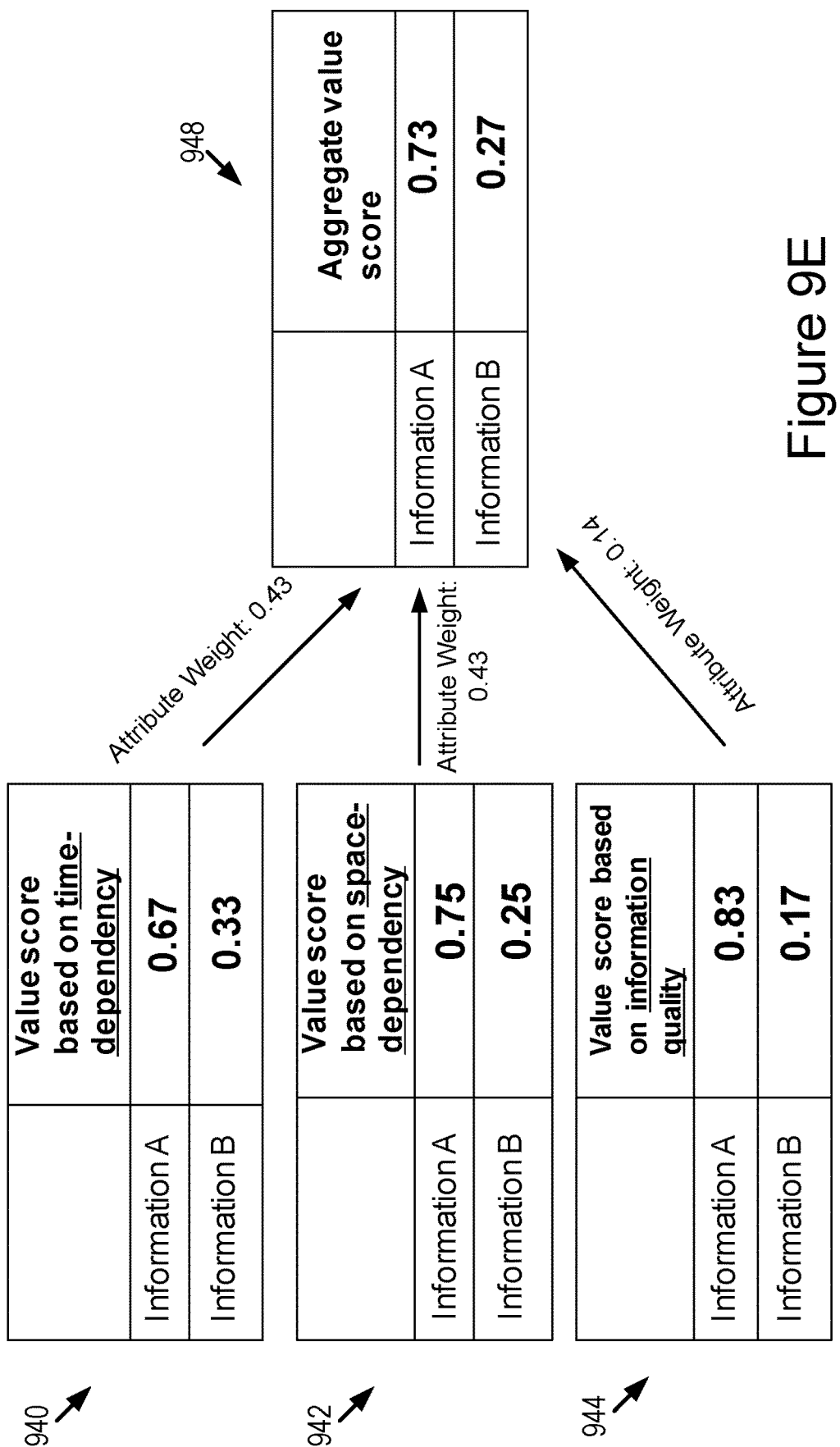
FIG. 9E is a graphical representation illustrating a calculation of aggregate value scores for the two pieces of information of FIGS. 9C-9D based on the application-dependent weights of FIG. 9B and the per-attribute value scores of FIG. 9D according to some embodiments.

For example, with reference to FIG. 9E, the value evaluator 206 calculates aggregate value scores for the two pieces of information of FIGS. 9C-9D based on the application-dependent weights of FIG. 9B and the per-attribute value scores of FIG. 9D. A matrix 940 that lists per-attribute value scores for Information A and Information B based on the time dependency attribute is derived from the value score calculation matrix 930 of FIG. 9D. The time dependency attribute has an application-dependent weight of 0.43 from the weight calculation matrix 910 of FIG. 9B.

Similarly, a matrix 942 that lists per-attribute value scores for Information A and Information B based on the space dependency attribute is derived from the value score calculation matrix 932 of FIG. 9D. The space dependency attribute has an application-dependent weight of 0.43 from the weight calculation matrix 910 of FIG. 9B. A matrix 944 that lists per-attribute value scores for Information A and Information B based on the information quality attribute is derived from the value score calculation matrix 934 of FIG. 9D. The information quality attribute has an application-dependent weight of 0.14 from the weight calculation matrix 910 of FIG. 9B.

Then, an aggregate value score for Information A is calculated by making a weighted average (or a weighted sum) of the per-attribute scores of Information A with respect to the time dependency attribute, the space dependency attribute, and the information quality attribute. For example, Information A has an aggregate value score 0.73 (0.67*0.43+0.75*0.43+0.83*0.14=0.73). An aggregate value score for Information B is calculated by making a weighted average (or a weighted sum) of the per-attribute scores of Information B with respect to the time dependency attribute, the space dependency attribute, and the information quality attribute. For example, Information B has an aggregate value score 0.27 (0.33*0.43+0.25*0.43+0.17*0.14=0.27). The aggregate value scores for Information A and Information B are listed in a matrix 948 depicted in FIG. 9E.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a connected vehicle, comprising:
   determining that one or more values of one or more pieces of information from a stream of data bits are valuable information that are intended to be delivered to an endpoint via a Vehicle to Everything (V2X) network by:
     evaluating, for a series of value attributes, a series of per-attribute value scores for a corresponding piece of information based on one or more value-evaluation factors of the corresponding piece of information and a roadway context of the endpoint; and
     integrating the series of per-attribute value scores to calculate an aggregate value score for the corresponding piece of information;
   implementing a communication-assurance action on the stream of data bits based on the one or more values and a network condition of the V2X network; and
   modifying an operation of a communication unit of the connected vehicle based on the communication-assurance action so that the valuable information included in the one or more pieces of information is delivered to the endpoint even in a scenario where the V2X network is congested.

2. The method of claim 1, further comprising:
   determining context data that describes a roadway context of the endpoint,
   wherein the one or more values of the one or more pieces of information are determined based at least in part on the roadway context of the endpoint.

3. The method of claim 2, further comprising:
   annotating each piece of information from the one or more pieces of information with factor data describing one or more value-evaluation factors for the corresponding piece of information,
   wherein a value of the corresponding piece of information is determined further based on the one or more value-evaluation factors.

4. The method of claim 3, wherein the one or more value-evaluation factors include one or more of: a type of an application that generates a set of data bits describing the corresponding piece of information; a type of data content described by the set of data bits; a timestamp describing when the set of data bits is generated; an importance level of the corresponding piece of information; an accuracy of the corresponding piece of information; a resolution of the corresponding piece of information; or a source of the corresponding piece of information.

5. The method of claim 1, wherein the valuable information includes at least one of safety-related information that helps the endpoint operate more safely, efficiency-related information that helps the endpoint operate more efficiently, or a type of information that an operator of the endpoint explicitly specified as being valuable.

6. The method of claim 1, wherein the series of value attributes includes one or more of: a time dependency attribute; a space dependency attribute; an information quality attribute; a conditionality attribute; a generalizability attribute; an urgency attribute; and an information path attribute.

7. The method of claim 1, wherein the aggregate value score is an average of the series of per-attribute value scores.

8. The method of claim 1, wherein integrating the series of per-attribute value scores to calculate the aggregate value score comprises:
   executing an analytic hierarchy process to calculate the aggregate value score for the corresponding piece of information based on the series of per-attribute value scores.

9. The method of claim 8, wherein executing the analytic hierarchy process to calculate the aggregate value score comprises:
   determining a corresponding application-dependent weight for each value attribute from the series of value attributes; and
   calculating a weighted average of the series of per-attribute value scores as the aggregate value score for the corresponding piece of information based on the corresponding application-dependent weight for each value attribute.

10. The method of claim 1, wherein implementing the communication-assurance action on the stream of data bits comprises:
    storing one or more sets of data bits included in the stream of data bits in a queue, wherein the one or more sets of data bits describe the one or more pieces of information respectively;
    sorting the one or more sets of data bits in the queue based on the one or more values of the one or more pieces of information; and forwarding the one or more sets of data bits to the communication unit of the connected vehicle sequentially based on an order of the one or more sets of data bits in the queue, so that the communication unit of the connected vehicle is configured to transmit the valuable information to the endpoint before other information included in the one or more pieces of information.

11. The method of claim 1, further comprising:
determining network data that describes the network condition of the V2X network, wherein implementing the communication-assurance action on the stream of data bits comprises:
responsive to the network condition of the V2X network exceeding a predetermined congestion threshold, triggering one or more remedial actions to be performed on the stream of data bits.

12. The method of claim 11, wherein the one or more remedial actions include one or more of: reducing a transmission rate of the stream of data bits so that a transmission speed of the communication unit of the connected vehicle is reduced; discarding, from the stream of data bits, one or more sets of data bits based on the one or more values so that the communication unit of the connected vehicle transmits one or more remaining sets of data bits that describe the valuable information to the endpoint via the V2X network; implementing a hybrid networking configuration so that one or more network interfaces corresponding to one or more types of V2X networks are selected to transmit the valuable information to the endpoint in parallel; and transmitting the valuable information to the endpoint multiple times.

13. The method of claim 12, wherein the one or more remaining sets of data bits that describe the valuable information each correspond to a value greater than a predetermined value threshold, and the one or more sets of data bits to be discarded that describe other information included in the one or more pieces of information each correspond to a value less than the predetermined value threshold.

14. The method of claim 12, wherein the one or more remaining sets of data bits that describe the valuable information each correspond to a value greater than that of each of the one or more sets of data bits to be discarded that describe other information included in the one or more pieces of information.

15. A system comprising:
an onboard vehicle computer system of a connected vehicle, including a communication unit, a processor and a non-transitory memory storing computer code which, when executed by the processor, causes the processor to:
determine that one or more values of one or more pieces of information from a stream of data bits are valuable information that are intended to be delivered to an endpoint via a Vehicle to Everything (V2X) network by:
evaluating, for a series of value attributes, a series of per-attribute value scores for a corresponding piece of information based on one or more value-evaluation factors of the corresponding piece of information and a roadway context of the endpoint; and
integrating the series of per-attribute value scores to calculate an aggregate value score for the corresponding piece of information;
implement a communication-assurance action on the stream of data bits based on the one or more values and a network condition of the V2X network; and
modify an operation of the communication unit of the connected vehicle based on the communication-assurance action so that the valuable information included in the one or more pieces of information is delivered to the endpoint even in a scenario where the V2X network is congested.

16. The system of claim 15, wherein the computer code, when executed by the processor, causes the processor further to:
annotate each piece of information from the one or more pieces of information with factor data describing one or more value-evaluation factors for the corresponding piece of information; and
determine context data that describes a roadway context of the endpoint,
wherein a value of each piece of information is determined based on the one or more value-evaluation factors of the corresponding piece of information and the roadway context of the endpoint.

17. The system of claim 15, wherein the valuable information includes at least one of safety-related information that helps the endpoint operate more safely, efficiency-related information that helps the endpoint operate more efficiently, or a type of information that an operator of the endpoint explicitly specified as being valuable.

18. The system of claim 15, wherein the computer code, when executed by the processor, causes the processor further to:
determine network data that describes the network condition of the V2X network,
wherein the computer code, when executed by the processor, causes the processor to implement the communication-assurance action on the stream of data bits at least by:
responsive to the network condition of the V2X network exceeding a predetermined congestion threshold, triggering one or more remedial actions to be performed on the stream of data bits.

19. A computer program product comprising a non-transitory memory storing computer-executable code that, when executed by a processor, causes the processor to:
determine one or more values of the one or more pieces of information from a stream of data bits are valuable information that are intended to be delivered to an endpoint via a Vehicle to Everything (V2X) network by:
evaluating, for a series of value attributes, a series of per-attribute value scores for a corresponding piece of information based on one or more value-evaluation factors of the corresponding piece of information and a roadway context of the endpoint; and
integrating the series of per-attribute value scores to calculate an aggregate value score for the corresponding piece of information;
implement a communication-assurance action on the stream of data bits based on the one or more values and a network condition of the V2X network; and
modify an operation of a communication unit of a connected vehicle based on the communication-assurance action so that the valuable information included in the one or more pieces of information is delivered to the endpoint even in a scenario where the V2X network is congested.

20. The computer program product of claim 19, wherein the computer code, when executed by the processor, causes the processor further to:

determine network data that describes the network condition of the V2X network, wherein the computer code, when executed by the processor, causes the processor to implement the communication-assurance action on the stream of data bits at least by:

responsive to the network condition of the V2X network exceeding a predetermined congestion threshold, triggering one or more remedial actions to be performed on the stream of data bits.

* * * * *